(12) United States Patent
Bhagat et al.

(10) Patent No.: US 12,296,549 B2
(45) Date of Patent: *May 13, 2025

(54) METHODS AND APPARATUSES FOR CASTING POLYMER PRODUCTS

(71) Applicant: MAGIC LEAP, INC., Plantation, FL (US)

(72) Inventors: Sharad D. Bhagat, Austin, TX (US); Chieh Chang, Cedar Park, TX (US); Christophe Peroz, Tokyo (JP)

(73) Assignee: Magic Leap, Inc., Plantation, FL (US)

( * ) Notice: Subject to any disclaimer, the term of this patent is extended or adjusted under 35 U.S.C. 154(b) by 242 days.

This patent is subject to a terminal disclaimer.

(21) Appl. No.: 17/539,969

(22) Filed: Dec. 1, 2021

(65) Prior Publication Data

US 2022/0088839 A1 Mar. 24, 2022

Related U.S. Application Data

(63) Continuation of application No. 17/285,877, filed as application No. PCT/US2019/056519 on Oct. 16, 2019, now Pat. No. 11,198,233.
(Continued)

(51) Int. Cl.
*B29D 11/00* (2006.01)
*B29C 35/08* (2006.01)
(Continued)

(52) U.S. Cl.
CPC .... *B29D 11/00663* (2013.01); *B29C 35/0888* (2013.01); *B29C 39/26* (2013.01);
(Continued)

(58) Field of Classification Search
CPC .......... B29D 11/00663; B29C 35/0888; B29C 39/26
See application file for complete search history.

(56) References Cited

U.S. PATENT DOCUMENTS 4,360,015 A 11/1982 Mayer
4,547,037 A 10/1985 Case
(Continued)

FOREIGN PATENT DOCUMENTS

CA 3013957 A1 8/2017
CN 1426439 A 6/2003
(Continued)

OTHER PUBLICATIONS

Extended European Search Report in European Appln. No. 19873527.6, dated Dec. 14, 2021, 14 pages.
(Continued)

*Primary Examiner* — Mathieu D Vargot
(74) *Attorney, Agent, or Firm* — Fish & Richardson P.C.

(57) ABSTRACT

In an example method of forming a waveguide part having a predetermined shape, a photocurable material is dispensed into a space between a first mold portion and a second mold portion opposite the first mold portion. A relative separation between a surface of the first mold portion with respect to a surface of the second mold portion opposing the surface of the first mold portion is adjusted to fill the space between the first and second mold portions. The photocurable material in the space is irradiated with radiation suitable for photocuring the photocurable material to form a cured waveguide film so that different portions of the cured waveguide film have different rigidity. The cured waveguide film is separated from the first and second mold portions. The waveguide part is singulated from the cured waveguide film. The waveguide part corresponds to portions of the cured waveguide film having a higher rigidity than other portions of the cured waveguide film.

20 Claims, 11 Drawing Sheets

Related U.S. Application Data

(60) Provisional application No. 62/746,414, filed on Oct. 16, 2018.

(51) Int. Cl.
  *B29C 39/26* (2006.01)
  *B29L 11/00* (2006.01)

(52) U.S. Cl.
  CPC ............. *B29C 2035/0827* (2013.01); *B29L 2011/0075* (2013.01)

(56) References Cited

U.S. PATENT DOCUMENTS

| | | |
|---|---|---|
| 4,723,953 A | 2/1988 | Rosenbaum et al. |
| 5,007,977 A | 4/1991 | Gottschald |
| 5,029,985 A | 7/1991 | Suzuki et al. |
| 5,210,630 A | 5/1993 | Heynderickx et al. |
| 5,547,747 A | 8/1996 | Trokhan et al. |
| 5,556,085 A | 9/1996 | Cyr |
| 5,931,755 A | 8/1999 | Mailey et al. |
| 5,999,237 A * | 12/1999 | Miyawaki ............ G02F 1/13454 349/95 |
| 6,165,547 A | 12/2000 | Leedom |
| 6,456,355 B1 | 9/2002 | Choi et al. |
| 6,547,940 B2 | 4/2003 | Aksay et al. |
| 7,081,940 B2 | 7/2006 | Suzuki |
| 7,713,436 B1 | 5/2010 | Trajkovska-Petkoska et al. |
| 7,718,124 B2 | 5/2010 | Simmet |
| 8,042,280 B2 | 10/2011 | Watanabe et al. |
| 8,083,349 B2 | 12/2011 | Ho et al. |
| 8,357,312 B2 | 1/2013 | Sun |
| 10,241,260 B2 | 3/2019 | Miller et al. |
| 11,022,748 B2 | 6/2021 | Miller et al. |
| 11,198,233 B2 * | 12/2021 | Bhagat ............... B29C 35/0888 |
| 2002/0154264 A1 | 10/2002 | Suzuki |
| 2002/0181128 A1 | 12/2002 | Beattie et al. |
| 2003/0220059 A1 | 11/2003 | Yamasaki |
| 2004/0057683 A1 | 3/2004 | Shimizu et al. |
| 2005/0155704 A1 | 7/2005 | Yokajty et al. |
| 2005/0237615 A1 | 10/2005 | Urey et al. |
| 2006/0204205 A1 | 9/2006 | Hayashi |
| 2006/0239169 A1 | 10/2006 | Marumo et al. |
| 2007/0082288 A1 | 4/2007 | Wright et al. |
| 2007/0103747 A1 | 5/2007 | Powell et al. |
| 2007/0207560 A1 | 9/2007 | LeCain et al. |
| 2007/0258691 A1 | 11/2007 | Charters et al. |
| 2008/0089637 A1 | 4/2008 | Farah |
| 2008/0308971 A1 | 12/2008 | Liu et al. |
| 2009/0053850 A1 | 2/2009 | Nishida et al. |
| 2009/0256977 A1 | 10/2009 | Haddock et al. |
| 2010/0202731 A1 | 8/2010 | Mitsumori |
| 2011/0024862 A1 | 2/2011 | Tu et al. |
| 2011/0026039 A1 | 2/2011 | Nimmakayala et al. |
| 2011/0207328 A1 | 8/2011 | Speakman |
| 2012/0013969 A1 | 1/2012 | Wang et al. |
| 2012/0212414 A1 | 8/2012 | Osterhout et al. |
| 2012/0224276 A1 | 9/2012 | Lin et al. |
| 2013/0174333 A1 | 7/2013 | Schwartz |
| 2015/0023643 A1 | 1/2015 | Chartoff et al. |
| 2015/0070602 A1 | 3/2015 | Fujita |
| 2015/0158240 A1 | 6/2015 | Haase et al. |
| 2015/0168646 A1 | 6/2015 | Arai |
| 2015/0277126 A1 | 10/2015 | Hirano et al. |
| 2016/0116739 A1 | 4/2016 | TeKolste et al. |
| 2016/0318213 A1 | 11/2016 | Benson |
| 2017/0191754 A1 | 7/2017 | Jing et al. |
| 2017/0276944 A1 | 9/2017 | Kim et al. |
| 2017/0299810 A1 | 10/2017 | Brouwer et al. |
| 2018/0052276 A1 | 2/2018 | Klienman et al. |
| 2018/0059320 A1 * | 3/2018 | Miller ................... G02B 27/01 |
| 2018/0120198 A1 | 5/2018 | Glasenapp et al. |
| 2018/0250670 A1 | 9/2018 | Le Berre et al. |
| 2019/0111642 A1 | 4/2019 | Chang et al. |
| 2019/0170932 A1 | 6/2019 | Miller et al. |
| 2019/0377200 A1 | 12/2019 | Xing et al. |
| 2021/0311298 A1 | 10/2021 | Xing et al. |

FOREIGN PATENT DOCUMENTS

| | | |
|---|---|---|
| CN | 101589326 A | 11/2009 |
| CN | 102236208 A | 11/2011 |
| CN | 102365567 A | 2/2012 |
| CN | 103869526 A | 6/2014 |
| CN | 204084009 U | 1/2015 |
| CN | 104950442 A | 9/2015 |
| CN | 105161506 A | 12/2015 |
| JP | H09050046 A | 2/1997 |
| JP | 2002-328377 A | 11/2002 |
| JP | 2004031939 A | 1/2004 |
| JP | 2004272012 A | 9/2004 |
| JP | 2005231960 A | 9/2005 |
| JP | 2007-233303 A | 9/2007 |
| JP | 2012058683 A | 3/2012 |
| JP | 2016107524 A | 6/2016 |
| JP | 2018506068 A | 3/2018 |
| JP | 2020511795 A | 4/2020 |
| KR | 20050069214 A | 7/2005 |
| KR | 10-2016-0097286 A | 8/2016 |
| WO | WO 2015128408 | 9/2015 |

OTHER PUBLICATIONS

Notice of Allowance in Japanese Appln. No. 2021-520948, dated Nov. 28, 2022, 5 pages (with English translation).
CN Office Action in Chinese Application No. 201780051980.X, dated Nov. 20, 2020, 16 pages (with English translation).
EP Extended European Search Report in European Application No. EP17844429, dated Aug. 8, 2019, 7 pages.
KR Office Action in Korean Application No. 10-2019-7008606, dated Dec. 3, 2020, 7 pages (with English translation).
PCT International Search Report and Written Opinion for International Appln. No. PCT/US2017/048442, dated Nov. 16, 2017, 14 pages.
PCT International Search Report and Written Opinion in International Appln. No. PCT/US2019/056519, dated Jan. 10, 2020, 13 pages.
PCT International Search Report and Written Opinion in International Appln. No. PCT/US2019/036782, mailed Sep. 5, 2019, 8 pages.
PCT International Search Report and Written Opinion in International Appln. No. PCT/US2019/042804, dated Oct. 10, 2019, 8 pages.
Office Action in Japanese Appln. No. 2021-503589, dated Apr. 4, 2023, 10 pages (with English translation).
Extended European Search Report in European Appln. No. 23190027.5, dated Oct. 2, 2023, 8 pages.
Notice of Allowance in Chinese Appln. No. 202210366992.4, dated Nov. 24, 2023, 7 pages (with English translation).
Notice of Allowance in Japanese Appln. No. 2022-198424, dated Dec. 26, 2023, 5 pages (with English translation).
Office Action in Chinese Appln. No. 201980082625.8, dated Feb. 11, 2022, 12 pages (with English translation).
Office Action in Japanese Appln. No. 2024-009409, dated Aug. 5, 2024, 5 pages (with English translation).
Office Action in Japanese Appln. No. 2023-171305, mailed Sep. 30, 2024, 7 pages (with English translation).

* cited by examiner

METHODS AND APPARATUSES FOR CASTING POLYMER PRODUCTS

CROSS-REFERENCE TO RELATED APPLICATIONS

This application is a continuation of U.S. application Ser. No. 17/285,877, filed on Apr. 15, 2021, now U.S. Pat. No. 11,198,233, which is a U.S. National Stage Application under 35 USC § 371 and claims the benefit of International Patent Application No. PCT/US2019/056519, filed on Oct. 16, 2019, which claims the benefit of U.S. Provisional Application Ser. No. 62/746,414, filed on Oct. 16, 2018, the disclosures of which are incorporated herein by reference in their entirety.

TECHNICAL FIELD

This disclosure relates to optical polymer films and methods for producing the same.

BACKGROUND

Optical imaging systems, such as wearable imaging headsets, can include one or more eyepieces that present projected images to a user. Eyepieces can be constructed using thin layers of one or more highly refractive materials. As examples, eyepieces can be constructed from one or more layers of highly refractive glass, silicon, metal, or polymer substrates.

In some cases, an eyepiece can be patterned (e.g., with one or more light diffractive nanostructures), such that it projects an image according to a particular focal depth. For an example, to a user viewing a patterned eyepiece, the projected image can appear to be a particular distance away from the user.

Further, multiple eyepieces can be used in conjunction to project a simulated three-dimensional image. For example, multiple eyepieces—each having a different pattern—can be layered one atop another, and each eyepiece can project a different depth layer of a volumetric image. Thus, the eyepieces can collectively present the volumetric image to the user across three-dimensions. This can be useful, for example, in presenting the user with a "virtual reality" environment.

To improve the quality of a projected image, an eyepiece can be constructed such that unintended variations in the eyepiece are eliminated, or otherwise reduced. For example, an eyepiece can be constructed such that it does not exhibit any wrinkles, uneven thicknesses, or other physical distortions that might negatively affect the performance of the eyepiece.

SUMMARY

System and techniques for producing polymer films are described herein. One or more of the described implementations can be used to produce polymer film in a highly precise, controlled, and reproducible manner. The resulting polymer films can be used in a variety of variation-sensitive applications in which extremely tight tolerances on film dimensions are desired. For instance, the polymer films can be used in optical applications (e.g., as a part of eyepieces in an optical imaging system) in which material homogeneity and dimensional constraints are on the order of optical wavelengths or smaller.

In general, polymer films are produced by enclosing a photocurable material (e.g., a photopolymer or light-activated resin that hardens when exposed to light) between two molds, and curing the material (e.g., by exposing the material to light and/or heat). Further, a "singulation" process can be performed to separate the polymer film into multiple different products (e.g., by cutting the polymer film one or more times to obtain separate products having particular sizes and shapes) and/or to remove excess polymer material from edges of the polymer product.

In some cases, performing a singulation process may introduce undesirable variations in the polymer film, and render the resulting products less suitable for use in variation-sensitive environments. For example, singulation is sometimes performed using techniques such as die-cutting, milling, water-jet cutting, ultrasonic cutting, or laser cutting to separate polymer films into different portions. However, if the polymer film is too brittle, it may crack or chip when being cut, resulting in poor edge quality. These imperfections can negatively impact the production process (e.g., as it more difficult to make accurate and precise cuts during the production), reducing yield in applications demanding high precision edges. Further, these imperfections can render the resulting polymer products less suitable for their intended use. For example, the chips and cracks may interfere with the intended optical characteristics of the polymer product, and negatively impact the performance of the polymer product. As another example, this can generate debris, which can damage the polymer product and/or make it more difficult to stack polymer products together with a high degree of precision (e.g., in a multi-optic device). Further, these imperfections can increase the variability of the polymer products between product to product. Accordingly, the polymer products may be less suitable for use in variation-sensitive applications.

Example techniques for singulating a polymer film are described herein. One or more of the described techniques can be performed to separate a polymer film into multiple different products, while eliminating or otherwise reducing the occurrence of unintended chips or cracks. Accordingly, polymer products can be produced more efficiently, consistently, and accurately.

In an aspect a method of forming a waveguide part having a predetermined shape includes dispensing a photocurable material into a space between a first mold portion and a second mold portion opposite the first mold portion, and adjusting a relative separation between a surface of the first mold portion with respect to a surface of the second mold portion opposing the surface of the first mold portion to fill the space between the first and second mold portions. The method also includes irradiating the photocurable material in the space with radiation suitable for photocuring the photocurable material to form a cured waveguide film so that different portions of the cured waveguide film have different rigidity. The method also includes separating the cured waveguide film from the first and second mold portions, and singulating the waveguide part from the cured waveguide film. The waveguide part corresponds to portions of the cured waveguide film having a higher rigidity than other portions of the cured waveguide film.

Implementations of this aspect can include one or more of the following features.

In some implementations, different portions of the photocurable material can be irradiated with different amounts of radiation. Portions of the photocurable material irradiated with higher radiation doses can correspond to portions of the cured waveguide film having higher rigidity than portions of the waveguide film irradiated with lower radiation doses. Different amounts of radiation can be supplied by irradiating the space through a mask. The mask can include apertures corresponding to the predetermined shape of the waveguide part.

In some implementations, the waveguide part can have a thickness of no more than 1000 μm and an area of at least 1 cm².

In another aspect, a method of forming a waveguide part having a predetermined shape includes dispensing a photocurable material into a space between a first mold portion and a second mold portion opposite the first mold portion, and adjusting a relative separation between a surface of the first mold portion with respect to a surface of the second mold portion opposing the surface of the first mold portion to fill the space between the first and second mold portions. The method also includes irradiating the photocurable material in the space with radiation suitable for photocuring the photocurable material to form a cured waveguide film. The method also includes separating the cured waveguide film from the first and second mold portions to provide the waveguide part, and singulating a portion of the cured waveguide film in the predetermined shape from the cured waveguide film, and annealing the singulated portion to provide the waveguide part. The waveguide part has a rigidity higher than a rigidity of the cured waveguide film.

Implementations of this aspect can include one or more of the following features.

In some implementations, the singulated portion can be annealed by irradiating the singulated portion with radiation suitable for photocuring the photocurable material.

In some implementations, the singulated portion can be annealed by heating the singulated portion.

In some implementations, the waveguide part can have a thickness of no more than 1000 μm and an area of at least 1 cm².

In another aspect, a method of forming a waveguide part having a predetermined shape includes positioning a frame between a first mold portion and a second mold portion, the frame having a rigidity, and the frame defining a first aperture having the predetermined shape, and dispensing a photocurable material into the aperture of the frame. The method also includes irradiating the photocurable material in the aperture with radiation suitable for photocuring the photocurable material to form a cured waveguide film having a rigidity different from the frame's rigidity, and separating the cured waveguide film from the first and second mold portions. The method also includes singulating the waveguide part from the cured waveguide film by cutting a path along the frame. The path at least partially encircles the aperture, The method also includes extracting, from the frame along the path, the waveguide part comprising the cured photocurable material.

Implementations of this aspect can include one or more of the following features.

In some implementations, the frame can define a plurality of apertures, each having the predetermined shape. The photocurable material can be dispensed into each of the apertures of the frame. The photocurable material in each of the apertures can be simultaneously irradiated with the radiation. The cured waveguide film can include the cured photocurable material in each of the apertures.

In some implementations, the waveguide part can have a thickness of no more than 1000 μm and an area of at least 1 cm².

The details of one or more embodiments are set forth in the accompanying drawings and the description below.

Other features and advantages will be apparent from the description and drawings, and from the claims.

DETAILED DESCRIPTION

System and techniques for producing polymer film are described herein. One or more of the described implementations can be used to produce polymer film in a highly precise, controlled, and reproducible manner. The resulting polymer films can be used in a variety of variation-sensitive applications (e.g., as a part of eyepieces in an optical imaging system).

In some implementations, polymer films can be produced such that wrinkles, uneven thicknesses, or other unintended physical distortions are eliminated or otherwise reduced. This can be useful, for example, as the resulting polymer film exhibits more predictable physical and/or optical properties. For example, polymer films produced in this manner can diffract light in a more predictable and consistent manner, and thus, may be more suitable for use a high resolution optical imaging system. In some cases, optical imaging systems using these polymer films can produce sharper and/or higher resolution images than might otherwise be possible with other polymer films.

Figure 1:
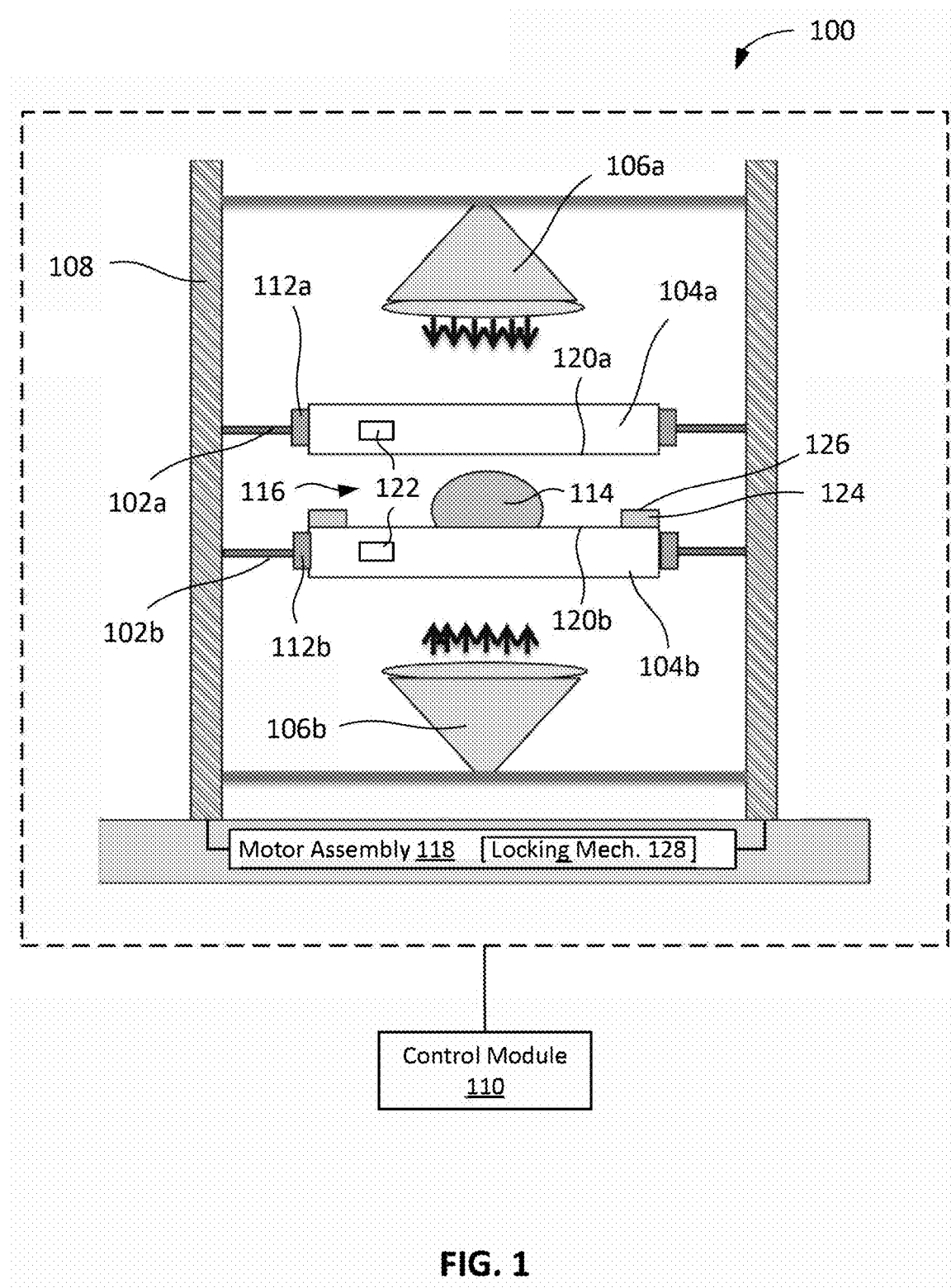
FIG. 1 is a diagram of an example system for producing polymer.

An example system 100 for producing polymer film is shown in FIG. 1. The system 100 includes two actuable stages 102a and 102b, two mold structures 104a and 104b, two light sources 106a and 106b, a support frame 108, and a control module 110.

During operation of the system 100, the two mold structures 104a and 104b (also referred to as "optical flats") are secured to the actuable stages 102a and 102b, respectively (e.g., through clamps 112a and 112b). In some cases, the clamps 112a and 112b can be magnetic (e.g., electromagnets) and/or pneumatic clamps that enable the mold structures 104a and 104b to be reversibly mounted to and removed from the actuable stages 102a and 102b. In some cases, the clamps 112a and 112b can be controlled by a switch and/or by the control module 110 (e.g., by selectively applying electricity to the electromagnets of the clamps 112a and 112b and/or selectively actuating pneumatic mechanisms to engage or disengage the molds structures).

A photocurable material 114 (e.g., a photopolymer or light-activated resin that hardens when exposed to light) is deposited into the mold structure 104b. The mold structures 104a and 104b are moved into proximity with one another (e.g., by moving the actuable stages 102a and/or 102b vertically along the support frame 108), such that the photocurable material 114 is enclosed by the mold structures 104a and 104b. The photocurable material 114 is then cured (e.g., by exposing the photocurable material 114 to light from the light sources 106a and/or 106b), forming a thin film having one or more features defined by the mold structures 104a and 104b. After the photocurable material 114 has been cured, the mold structures 104a and 104b are moved away from each other (e.g., by moving the actuable stages 102a and/or 102b vertically along the support frame 108), and the film is extracted.

The actuable stages 102a and 102b are configured to support the mold structures 104a and 104b, respectively. Further, the actuable stages 102a and 102b are configured to manipulate the mold structures 104a and 104b, respectively, in one or more dimensions to control a gap volume 116 between the mold structures 104a and 104b.

For instance, in some cases, the actuable stage 102a can translate the mold structure 104a along one or more axes. As an example, the actuable stage 102a can translate the mold structure 104a along an x-axis, a y-axis, and/or a z-axis in a Cartesian coordinate system (i.e., a coordinate system having three orthogonally arranged axes). In some cases, the actuable stage 102a can rotate or tilt the mold structure 104a about one or more axes. As an example, the actuable stage 102a can rotate the mold structure 104a along an x-axis (e.g., to "roll" the mold structure 104a), a y-axis (e.g., to "pitch" the mold structure 104a), and/or a z-axis (e.g., to "yaw" the mold structure 104a) in a Cartesian coordinate system. Translation and/or rotation with respect to one or more other axes are also possible, either in addition to or instead of those described above. Similarly, the actuable stage 102b can also translate the mold structure 104b along one or more axes and/or rotate the mold structure 104b about one or more axes.

In some cases, the actuable stages 102a can manipulate the mold structure 104a according to one or more degrees of freedom (e.g., one, two, three, four, or more degrees of freedom). For instance, the actuable stage 102a can manipulate the mold structure 104a according to six degrees of freedom (e.g., translation along an x-axis, y-axis, and z-axis, and rotation about the x-axis, y-axis, and z-axis). Manipulation according to one or more other degrees of freedom is also possible, either in addition to or instead of those described above. Similarly, the actuable stage 102b can also manipulate the mold structure 104b according to one or more degrees of freedom In some cases, the actuable stages 102a and 102b can include one or more motor assemblies configured to manipulate the mold structures 104a and 104b and control the gap volume 116. For example, the actuable stages 102a and 102b can include a motor assembly 118 configured to manipulate the actuable stages 102a and 102b, thereby repositioning and/or reorienting the actuable stages 102a and 102b.

In the example shown in FIG. 1, the actuable 102a and 102b can both be moved relative to the support frame 108 to control the gap volume 116. In some cases, however, one of the actuable stages can be moved relative to the support frame 108, while the other can remain static with respect to the support frame 108. For example, in some cases, the actuable stage 102a can be configured to translate in one or more dimensions relative to the support frame 108 through the motor assembly 118, while the actuable stage 102b can be held static with respect to the support frame 108.

The mold structures 104a and 104b collectively define an enclosure for the photocurable material 114. For example, the mold structures 104a and 104b, when aligned together, can define a hollow mold region (e.g., the gap volume 116), within which the photocurable material 114 can be deposited and cured into a film. The mold structures 104a and 104b can also define one or more structures in the resulting film. For example, the mold structures 104a and 104b can include one or more protruding structures (e., gratings) from the surfaces 120a and/or 120b that impart a corresponding channel in the resulting film. As another example, the mold structures 104a and 104b can include one or more channels defined in the surfaces 120a and/or 120b that impart a corresponding protruding structure in the resulting film. In some cases, the mold structures 104a and 104b can impart a particular pattern on one or both sides of the resulting film. In some cases, the mold structures 104a and 104b need not impart any pattern of protrusions and/or channels on the resulting film at all. In some cases, the mold structures 104a and 104b can define a particular shape and pattern, such that the resulting film is suitable for use as an eyepiece in an optical imaging system (e.g., such that the film has one or more light diffractive microstructures or nanostructures that impart particular optical characteristics to the film).

In some cases, the surfaces of the mold structures 104a and 104b that face each other can each be substantially flat, such that the gap volume 116 defined between them exhibits a TTV of 500 nm or less. For example, the mold structure 104a can include a substantially flat surface 120a, and the mold structure 104b can have substantially flat surface 120b. A substantially flat surface can be, for example, a surface that deviates from a flatness of an ideal flat surface (e.g., a perfectly flat surface) by 100 nm or less (e.g., 100 nm or less, 75 nm or less, 50 nm or less, etc.). A substantially flat surface can also have a local roughness of 2 nm or less (e.g., 2 nm or less, 1.5 nm or less, 1 nm or less, etc.) and/or an edge-to edge flatness of 500 nm or less (e.g., 500 nm or less, 400 nm or less, 300 nm or less, 50 nm or less, etc.). In some cases, one or both of the surfaces of the mold structures 104a and 104b can be polished (e.g., to further increase the flatness of the surfaces). A substantially flat surface can be beneficial, for example, as it enables the mold structures 104a and 104b to define a gap volume 116 that is substantially consistent in thickness along the extent of the mold structures 104a and 104b (e.g., having a TTV of 500 nm or less). Thus, the resulting optical films can be flat (e.g., having a total thickness variation [TTV] and/or a local thickness variation [LTV] less than or equal to a particular threshold value, for example less than 500 nm, less than 400 nm, less than 300 nm, etc.). Further, polished mold structures 104a and 104b can be beneficial, for example, in providing smoother optical films for optical imaging applications. As an example, eyepieces constructed from smoother optical films may exhibit improved imaging contrast.

Figure 7:
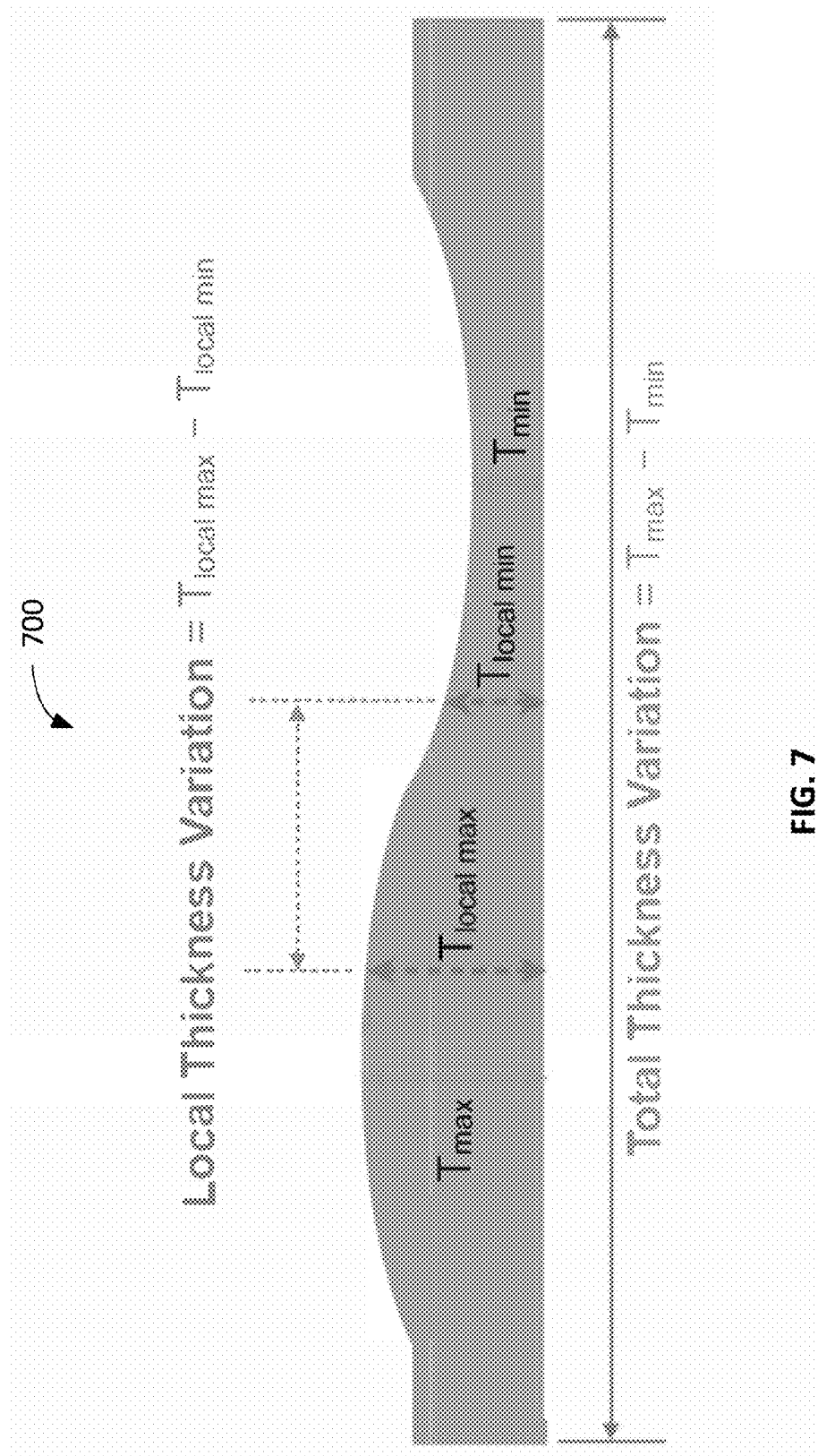
FIG. 7 is a diagram of a cross-section of an example optical film.

The TTV and LTV of an example optical film 700 are shown in FIG. 7. The TTV of the optical film 700 refers to the maximum thickness of the optical film 1000 with respect to the entirety of the optical film 700 ($T_{max}$), minus the minimum thickness of the optical film 700 with respect to the entirety of the optical film 700 ($T_{min}$) (e.g., TTV=$T_{max}$-$T_{min}$). The LTV of the optical film 700 refers to the maximum thickness of the optical film 700 with respect to a localized portion of the optical film 700 ($T_{local\ max}$), minus the minimum thickness of optical film 700 with respect to the localized portion of the optical film 700 ($T_{local\ min}$) (e.g., LTV=$T_{local\ max}$-$T_{local\ min}$). The size of the localized portion can differ, depending on the application. For example, in some cases, the localized portion can be defined as a portion of the optical film having a particular surface area. For instance, for optical films intended for used as eyepieces in an optical imaging system, the surface area of the localized portion can be an area having a 2.5-inch diameter. In some cases, the surface area of the localized portion can differ, depending on the eyepiece design. In some cases, the surface area of the localized portion can differ, depending on the dimensions and/or features of the optical film.

The mold structures 104a and 104b are also rigid, such that they do not flex or bend during the film production process. The rigidity of the mold structures 104a and 104b can be expressed in terms of its bending stiffness, which is a function of the elastic modulus of the mold structures (E) and the second moment of area of the mold structures (I). In some cases, the mold structures each can have a bending stiffness of 1.5 $Nm^2$ or greater.

Further still, the mold structures 104a and 104b can be partially or fully transparent to radiation at one or more wavelengths suitable for photocuring the photocurable material (e.g., between 315 nm and 430 nm). Further still, the mold structures 104a and 104b can the made from a material that is thermally stable (e.g., does not change in size or shape) up to a particular threshold temperature (e.g., up to at least 200° C.). For example, the mold structures 104a and 104b can be made of glass, silicon, quartz, Teflon, and/or poly-dimethyl-siloxane (PDMS), among other materials.

In some cases, the mold structures 104a and 104b can have a thickness greater than a particular threshold value (e.g., thicker than 1 mm, thicker than 2 mm, etc.). This can be beneficial, for example, as a sufficiently thick mold structure is more difficult to bend. Thus, the resulting film is less likely to exhibit irregularities in thickness. In some cases, the thickness of the mold structures 104a and 104b can be within a particular range. For example, each of the mold structures 104a and 104b can be between 1 mm and 50 mm thick. The upper limit of the range could correspond, for example, to limitations of an etching tool used to pattern the mold structures 104a and 104b. In practice, other ranges are also possible, depending on the implementation.

Similarly, in some cases, the mold structures 104a and 104b can have a diameter greater than a particular threshold value (e.g., greater than 3 inches). This can be beneficial, for example, as it enables relatively larger films and/or multiple individual films to be produced simultaneously. Further, if unintended particulate matter is entrapped between the mold structures (e.g., between a spacer structure 124 and an opposing mold structure 104a or 104b, such as at a position 126), its effect on the flatness of the resulting filming film is lessened.

For instance, for mold structures 104a and 104b having a relatively small diameter, a misalignment on one side of the mold structures 104a and 104b (e.g., due to entrapped particulate matter on one of the spacer structures 124, such as at the position 126) may result in a relatively sharper change in thickness in the gap volume 116 along the extent to the mold structures 104a and 104b. Thus, the resulting film or films exhibit more sudden changes in thickness (e.g., a steeper slope in thickness along the length of the film).

However, for mold structures 104a and 104b having a comparatively larger diameter, a misalignment on one side of the mold structures 104a and 104b will result in a more gradual change in thickness in the gap volume 116 along the extent to the mold structures 104a and 104b. Thus, the resulting film or films exhibit less sudden changes in thickness (e.g., a comparatively more gradual slope in thickness along the length of the film). Accordingly, mold structures 104a and 104b having a sufficiently large diameter are more "forgiving" with respect to entrapped particulate matter, and thus can be used to produce more consistent and/or flatter films.

As an example, if a particle of 5 µm or less is entrapped along a point at the periphery of the mold structures 104a and 104b (e.g., at the position 126), and the mold structures 104a and 104b each have a diameter of 8 inches, a gap volume having a horizontal surface area of 2 square inches within the extent of the mold structures 104a and 104b will still have a TTV of 500 nm or less. Thus, if a photocurable material is deposited within the gap volume, the resulting film will similarly exhibit a TTV of 500 nm or less.

The light sources 106a and 106b are configured to generate radiation at one or more wavelengths suitable for photocuring the photocurable material 114. The one or more wavelengths can differ, depending on the type of photocurable material used. For example, in some cases, a photocurable material (e.g., an ultraviolet light-curable liquid silicone elastomer such as Poly(methyl methacrylate) or Poly(dimethylsiloxane)) can be used, and correspondingly the light source can be configured to generate radiation having a wavelength in a range from 315 nm to 430 nm to photocure the photocurable material. In some cases, one or more of the mold structures 104a and 104b can be transparent, or substantially transparent to radiation at the suitable for photocuring the photocurable material 114, such that radiation from the light sources 106a and/or 106b can pass through the mold structures 104a and/or 104b and impinge upon the photocurable material 114.

The control module 110 is communicatively coupled to the actuable stages 102a and 102b, and is configured to control the gap volume 116. For instance, the control module 110 can receive measurements regarding gap volume 116 (e.g., the distance between the mold structures 104a and 104b at one or more locations) from the sensor assembly 122 (e.g., a device having one or more capacitive and/or pressure-sensitive sensor elements) and reposition and/or reorient one or both of the mold structures 104a and 104b in response (e.g., by transmitting commands to the actuable stages 102a and 102b).

As an example as shown in FIG. 1, the system 100 can include one or more spacer structures 124 (e.g., protrusions or gaskets) that project from one or more surfaces of the mold structure (e.g., mold structure 104b) and towards an opposing mold structure (e.g., mold structure 104a). The spacer structures 124 can each have a substantially equal vertical height, such that when the mold structures 104a and 104b are brought together (e.g., pressed together), the spacer structures 124 abut the mold structures 104a and 104b and a substantially flat gap volume 116 is defined between them.

Further, spacer structures 124 can be positioned in proximity to and at least partially enclosing the area of the mold structures 104a and 104b for receiving and curing the photocurable material 114. This can be beneficial, for example, as it enables the system 100 to produce polymer films having a low TTV and/or LTV, without necessarily requiring that a low TTV and/or LTV be maintained across the entirety of the extend of the mold structures 104a and 104b. For example, multiple different polymer films can be produced without the need of achieving low TTV over the entire volume between the mold structures 104a and 104b. Accordingly, the throughput of the production process can be increased.

Figure 2:
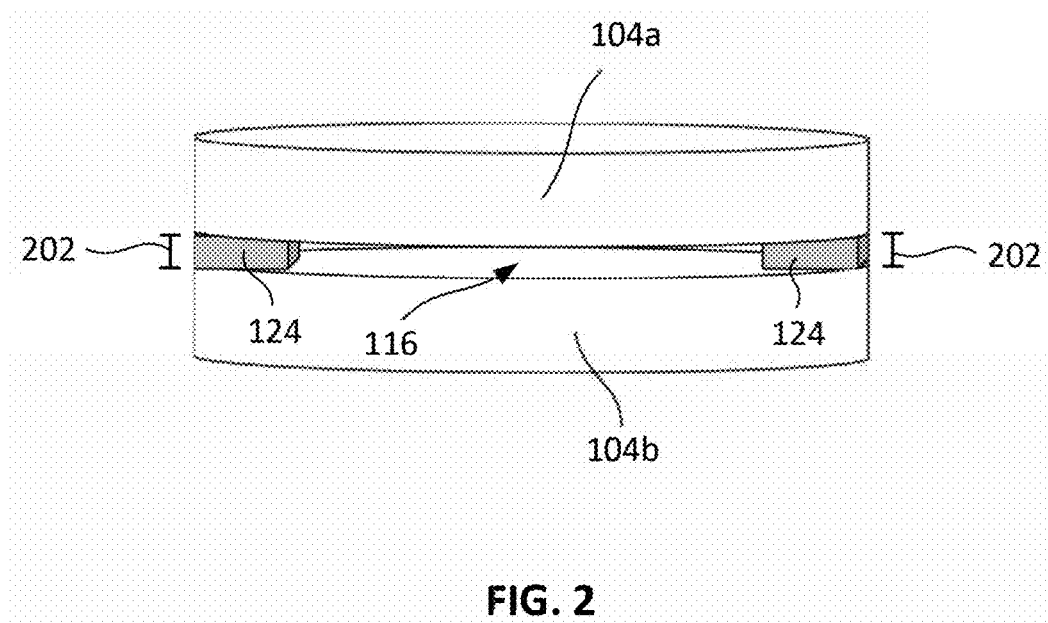
FIG. 2 is a diagram of example mold structures with spacing structures.

For example, FIG. 2 shows an example mold structures 104a and 104b with spacer structures 124 disposed between them. When the mold structures 104a and 104b are brought together, the spacer structures 124 abut the mold structures 104a and 104b and physically obstruct the mold structures 104a and 104b from getting any nearer to each other than the vertical height 202 of the spacer structures 124. As the vertical height 202 of each of the spacer structures 124 is substantially equal, a substantially flat gap volume 116 is defined between the mold structures 104a and 104b. In some cases, the vertical height 202 of the spacer structures 124 can be substantially equal to the desired thickness of the resulting film.

The spacer structures 124 can be constructed from various materials. In some cases, the spacer structures 124 can be constructed from a material that is thermally stable (e.g., does not change in size or shape) up to a particular threshold temperature (e.g., up to at least 200° C.). For example, the spacer structures 124 can be made of glass, silicon, quartz, and/or Teflon, among other materials. In some cases, the spacer structures 124 can be constructed from the same material as the mold structures 104a and/or 104b. In some cases, the spacer structures 124 can be constructed from a different material as the mold structures 104a and/or 104b. In some cases, one or more of the spacer structures 124 can be integrally formed with the mold structures 104a and/or 104b (e.g., etched from the mold structures 104a and/or 104b, imprinted onto the mold structures 104a and/or 104b through a lithographic manufacturing processes, or additively formed onto the mold structures 104a and/or 104b such as through an additive manufacturing processes). In some cases, one or more of the spacer structures 124 can be discrete from the mold structures 104a and/or 104b, and can be secured or affixed to the mold structures 104a and/or 104b (e.g., using glue or other adhesive).

Although two spacer structures 124 are shown in FIG. 2, this is merely an illustrative example. In practice, there can be any number of spacer structures 124 (e.g., one, two, three, four, or more) protruding from the mold structure 104a, the mold structure 104b, or both. Further still, although FIG. 2 shows the spacer structures 124 positioned along a periphery of the mold structures 104a and 104b, in practice, each spacer structures 124 can be positioned anywhere along the extent of the mold structures 104a and 104b.

Further, in some implementations, others mechanisms can be used to define a gap volume between the mold structures 104a and 104b, either in addition to or instead of the spacer structures 124. For example, the motor assembly 118 can be configured to manipulate the actuable stages 102a and 102b such that the mold structures 104a and 104b are separated from one another by a particular distance (e.g., in the z-direction, or the up and down direction of FIG. 1). In some implementations, the motor assembly 118 can include a locking mechanism 128 that prevents the motor assembly 118 from further moving the actuable stages 102a and 102b once they are in a particular position relative to one another. The locking mechanism 128 can be selectively engaged and disengaged during the manufacturing process.

As described herein, polymer films can be produced by enclosing a photocurable material (e.g., a photopolymer or light-activated resin that hardens when exposed to light) between two molds, and curing the material (e.g., by exposing the material to light and/or heat). Further, a "singulation" process can be performed to separate the polymer film into multiple different products (e.g., by cutting the polymer film one or more times to obtain separate products having particular sizes and shapes) and/or to remove excess polymer material from edges of the polymer product.

In some cases, performing a singulation process may introduce undesirable variations in the polymer film, and render the resulting products less suitable for use in variation-sensitive environments. For example, singulation is sometimes performed using techniques such as die-cutting, milling, water-jet cutting, ultrasonic cutting, or laser cutting to separate polymer films into different portions. However, if the polymer film is too brittle, it may crack or chip when being cut, resulting in poor edge quality. These imperfections can negatively impact the production process (e.g., as it more difficult to make accurate and precise cuts during the production), reducing yield in applications demanding high precision edges. Further, these imperfections can render the resulting polymer products less suitable for their intended use. For example, the chips and cracks may interfere with the intended optical characteristics of the polymer product, and negatively impact the performance of the polymer product. As another example, this can generate debris, which can damage the polymer product and/or make it more difficult to stack polymer products together with a high degree of precision (e.g., in a multi-optic device). Further, these imperfections can increase the variability of the polymer products between product to product. Accordingly, the polymer products may be less suitable for use in variation-sensitive applications.

Example techniques for singulating a polymer film are described herein. One or more of the described techniques can be performed to separate a polymer film into multiple different products, while eliminating or otherwise reducing the occurrence of unintended chips or cracks. Accordingly, polymer products can be produced more efficiently, consistently, and accurately.

In some cases, singulation can be performed by cutting one or more portions of polymer film that have not been fully cured. As those portions are less rigid and brittle compared to fully cured polymer film, the cuts are less likely to cause cracking or chips. The curing of a polymer film can be controlled, for example, by regulating the intensity of light applied to the photocurable material during the curing process and/or the exposure time of that light.

In some cases, localized portions of the polymer film (e.g., "singulation zones") can be selectively cured to a lesser extent than other portions of the polymer film). During the singulation process, the polymer film can be cut along these singulation zones. As the singulation zones are less rigid and brittle, the cut are less likely to result in cracks or chips, thereby improving the quality of the resulting polymer products.

Figure 3:
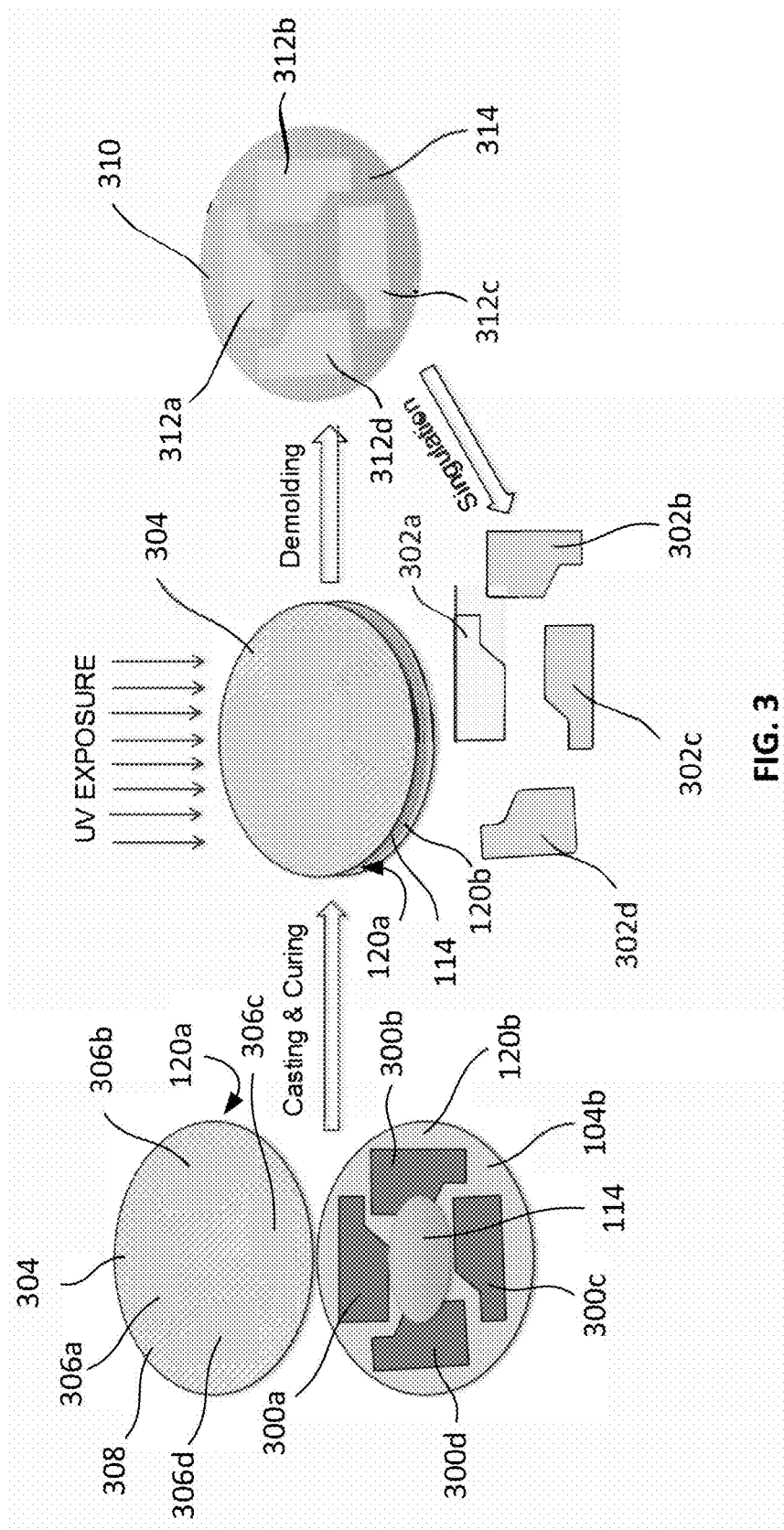
FIG. 3 is a schematic diagram of an example process for producing polymer products.

As an example, FIG. 3 is a simplified schematic diagram of an example process for producing polymer products using the system 100. The process shown in FIG. 3 can be used, for example, to produce optical components, such as waveguides or eyepieces for using a wearable imaging headsets. For ease of illustration, portions of the system 100 have been omitted.

In some cases, the process can be particularly useful for producing waveguides or eyepieces suitable for use in a headset. For instance, the process can be used to produce waveguides or eyepieces having a thickness and/or cross-sectional area that are sufficient to guide light and project light covering a field of view of a headset wearer. As an example, the process can be used to produce polymer products suitable for use in optical applications (e.g., as a part of waveguides or eyepieces in an optical imaging system). In some cases, the process can be particularly useful for producing waveguides or eyepieces suitable for use in a headset. For instance, the process can be used to produce waveguides or eyepieces having a thickness and/or cross-sectional area that are sufficient to guide light and project light covering a field of view of a headset wearer. As an example, the process can be used to produce polymer products having a thickness of no more than 1000 µm (e.g., as measured along the z-axis of a Cartesian coordinate system), such as 800 µm or less, 600 µm or less, 400 µm or less, 200 µm or less, 100 µm or less, or 50 µm or less, and an area of at least 1 cm² (e.g., as measured with respect an x-y plane of the Cartesian coordinate system), such as 5 cm² or more, 10 cm² or more, 50 cm² or more, such as up to about 100 cm² or less or up to 1000 cm² or less, and having a predetermined shape. In certain cases, the polymer film can have a dimension of at least 1 cm (e.g., 2 cm or more, 5 cm or more, 8 cm or more, 10 cm or more, such as about 30 cm or less) in at least one direction in the x-y plane.

As shown in the left portion of FIG. 3, a mold structure 104b includes a surface 120b. The mold structure 104b is configured such that, when the mold structure 104b is brought together with a corresponding mold structure 104a, they define one or more enclosed regions for casting and curing a photocurable material 114. Further, the surface 120b defines several areas 300a-d, each corresponding to the size and shape of a different polymer product 302a-d (e.g., waveguides or eyepieces).

Further, as described above, the mold structures 104a and 104b can also define one or more structures in the resulting film. For example, the mold structures 104a and 104b can include one or more protruding structures from the surfaces 120a and/or 120b of the mold structures that impart a corresponding channel in the resulting film. As another example, the mold structures 104a and 104b can include one or more channels defined in the surfaces 120a and/or 120b that impart a corresponding protruding structure in the resulting film. In some cases, the mold structures 104a and 104b can define a particular pattern, such that the resulting film is suitable for use as a waveguide or eyepiece in an optical imaging system (e.g., such that the film has one or more light diffractive microstructures or nanostructures that impart particular optical characteristics to the film).

During the casting process, an amount of photocurable material 114 is dispensed onto the mold structure 104b. The mold structures 104a and 104b are then moved into proximity with one another (e.g., by moving the actuable stages 102a and/or 102b described with respect to FIG. 1), such that the photocurable material 114 is enclosed by the mold structures 104a and 104b (e.g., as shown in the middle portion of FIG. 3).

Further, the system includes a mask 304 positioned between the mold structure 104b and a light source (e.g., the light source 106a shown and described with respect to FIG. 1). In some cases, the mask 304 can be positioned above the mold structure 104a (e.g., between the mold structure 104a and the light source). The mask 304 is configured to attenuate light emitted from the light source differently with respect to different locations of the mold structures 104a and 104b, such that certain portions of the photocurable material 114 are exposed to more intense light from the light source than other portions of the photocurable material 114. For example, the mask 304 can define several window areas 306a-d that transmit light having a first intensity onto photocurable material 114 positioned on the areas 300a-d of the mold structure 104b. Further, the mask 304 can include one or more attenuation areas 308 that transmit light having a second, lower intensity onto photocurable material 114 positioned on the areas of the mold structure 104b beyond the areas 300a-d. Accordingly, photocurable material 114 positioned on the areas 300a-d are cured more quickly than photocurable material 114 positioned beyond the areas 300a-d.

In some cases, the mask 304 can be a fused silica mold or a thin wafer. The window areas 306a-d can be regions that are transparent or substantially transparent to wavelengths of light suitable for photocuring the photocurable material. In some cases, the window areas 306a-d can have a similar size and/or shape as the areas 300a-d. The one or more attenuation areas 308 can be one or more regions that include structures or other features for attenuating the intensity of light with respect to those same wavelengths of light (e.g., light diffusing structures or gratings). In some cases, the attenuation areas 308 can attenuate the intensity of light by at least 10% (e.g., 10%, 20%, 30%, or more).

The photocurable material 114 is then cured (e.g., by irradiating the photocurable material 114 with light 304 suitable for photocuring the photocurable material 114), forming a polymer film 310 having one or more features defined by the mold structures 104a and 104b.

As shown in the right portion of FIG. 3, after the photocurable material 114 has been cured, the polymer film 310 is extracted or "demolded" from the mold structures 104a and 104b (e.g., by moving the mold structures 104a and 104b away from teach other, and removing the polymer film 310 between them).

Due to localized attenuation of light by the mask 304, certain portions of the polymer film 310 have been cured more than other portions of the polymer film 310. For example, the portions 312a-d (e.g., corresponding to the size and shape of the polymer products 302a-d) have been cured to a greater extent, due to the transmission of light through the window areas 306a-d of the mask 304. However, the portion 314 has been cured to a lesser extent, due to the attenuated transmission of light through the attenuation areas 308 of the mask 304. Accordingly, the portions 312a-d are relatively more rigid and brittle compared to the portion 314. In some cases, the portions 312a-d can have a Young's modulus greater than 2.0 GPa, and the portion 314 can have a Young's modulus between 1 GPa and 1.5 GPa.

The polymer film 310 can be singulated by cutting along the portion 308 to separate the polymer film 310 into different polymer products 302a-d. As the cuts are performed on portions of the polymer film 310 that are less rigid and brittle (e.g., along "singulation zones"), the cuts result in fewer cracks or chips. Accordingly, the quality of the polymer products 302a-d are improved (e.g., compared to polymer products formed from singulating a fully cured polymer film). Further, the polymer film can be cut more precisely, accurately, and consistently, resulting in product products exhibit lower variability from product to product.

In some cases, the light source can be configured to emit light according to specific spatial distributions to facilitate location-specific curing of photocurable material. For example, the light source can be configured to emit higher intensity light along the areas of the mold structures 104a and 104b corresponding the product products 302a-d (e.g., the areas 300a-d), while emitting less intense light along other portions of the mold structures 104a and 104b (e.g., the areas beyond the 300a-d). In some cases, the light source can emit highly directional and/or collimated light to precisely regulate the exposure of light with respect to specific portions of the mold structures 104a and 104b.

In practice, the operational parameters of the process can vary, depending on the implementation. As an example, a photocurable material LPB-1102 (Mitsubishi) can be cured by exposing it to ultraviolet (UV) light. The mask 304 can selectively attenuate the intensity of light with respect to particular locations of the mold structures, such that the "singulation zones" of the polymer film (e.g., the areas of the polymer film that will be cut during the singulation process) are exposed to light having an intensity between approximately 15 to 75 mW/cm². As a result, the singulation zones of the polymer film have a tensile modulus in the range of approximately 0.5 to 1.5 GPa. These portions are be soft enough that they may be readily singulated without chipping or cracking using die cutting, water-jet, and/or milling machine techniques. Further, the mask 304 can selectively transmit high intensity of (e.g., light having an intensity between approximately 15 to 75 mW/cm²) with respect to other locations of the mold structures (e.g., the portions of the polymer film corresponding on the polymer products), such that that those portions are fully cured. In some cases, the exposure times can be in the range of 10 to 300 seconds, depending on the intensity of the light.

As another example, a thiol-ene-based photocurable material MLP-02 (Magic Leap) also can be cured by exposing it to UV light. The mask 304 can selectively attenuate the intensity of light with respect to particular locations of the mold structures, such that the singulation zones of the polymer film are exposed to light having an intensity between approximately 15 to 150 mW/cm². As a result, the singulation zones of the polymer film have a tensile modulus in the range of approximately 0.5 to 1.5 GPa. These portions are be soft enough that they may be readily singulated without chipping or cracking using die cutting, water-jet, and/or milling machine techniques. Further, the mask 304 can selectively transmit high intensity of (e.g., light having an intensity between approximately 200 to 400 mW/cm²) with respect to other locations of the mold structures (e.g., the portions of the polymer film corresponding on the polymer products), such that that those portions are fully cured. In some cases, the exposure times can be in the range of 60 to 420 seconds, depending on the intensity of the light.

In some cases, the photocurable material can be partially cured into a polymer film (e.g., a polymer film that is less rigid and brittle than a fully cured polymer film). During the singulation process, the partially cured polymer film can be cut into one or more polymer products. Each of the polymer products can be subsequently annealed to complete the curing process. Thus, singulation is performed while the polymer film is not as rigid or brittle, which can improve the quality of the resulting polymer products (e.g., by reducing cracks or chips along their edges).

Figure 4:
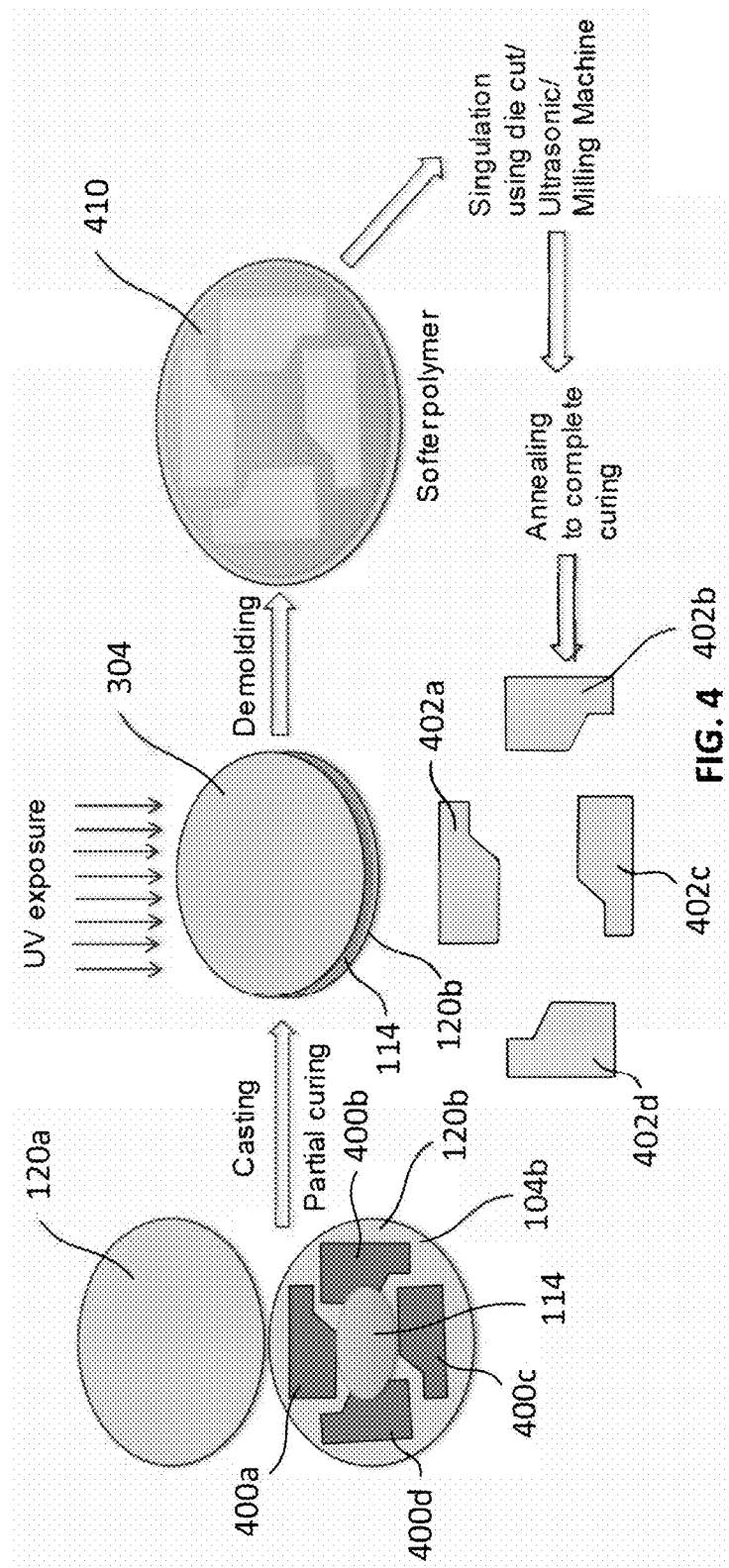
FIG. 4 is a schematic diagram of another example process for producing polymer products.

As an example, FIG. 4 is a simplified schematic diagram of another example process for producing polymer products using the system 100. The process shown in FIG. 4 can be used, for example, to produce optical components, such as waveguides or eyepieces for using a wearable imaging headsets. For ease of illustration, portions of the system 100 have been omitted. In a similar manner as described with respect to FIG. 3, the process can be particularly useful for producing waveguides or eyepieces suitable for use in a headset. For instance, the process can be used to produce waveguides or eyepieces having a thickness and/or cross-sectional area that are sufficient to guide light and project light covering a field of view of a headset wearer.

As shown in the left portion of FIG. 4, a mold structure 104b includes a surface 120b. The mold structure 104b is configured such that, when the mold structure 104b is brought together with a corresponding mold structure 104a, they define one or more enclosed regions for casting and curing a photocurable material 114. Further, the surface 120b defines several areas 400a-d, each corresponding to the size and shape of a different polymer product 402a-d (e.g., waveguides or eyepieces).

Further, as described above, the mold structures 104a and 104b can also define one or more structures in the resulting film. For example, the mold structures 104a and 104b can include one or more protruding structures from the surfaces 120a and/or 120b of the mold structures that impart a corresponding channel in the resulting film. As another example, the mold structures 104a and 104b can include one or more channels defined in the surfaces 120a and/or 120b that impart a corresponding protruding structure in the resulting film. In some cases, the mold structures 104a and 104b can define a particular pattern, such that the resulting film is suitable for use as a waveguide or eyepiece in an optical imaging system (e.g., such that the film has one or more light diffractive microstructures or nanostructures that impart particular optical characteristics to the film).

During the casting process, an amount of photocurable material 114 is dispensed onto the mold structure 104b. The mold structures 104a and 104b are then moved into proximity with one another (e.g., by moving the actuable stages 102a and/or 102b described with respect to FIG. 1), such that the photocurable material 114 is enclosed by the mold structures 104a and 104b (e.g., as shown in the middle portion of FIG. 4).

The photocurable material 114 is then partially cured (e.g., by irradiating the photocurable material 114 with light 304 suitable for photocuring the photocurable material 114), forming a partially cured polymer film 410 having one or more features defined by the mold structures 104a and 104b. In some cases, the photocurable material 114 can be partially cured by exposing it to an amount of light sufficient to harden the polymer film 410 until it has a stiffness and/or rigidity less than that of the finalized polymer products 402a-d. Further, the photocurable material 114 can cured such that it exhibits a certain degree of solidity (e.g., such that it retains its shape, even if the mold structure 104a is "peeled" away from the photocurable material 114). In some cases, the photocurable material 114 can be cured until it has a Young's modulus between 1 GPa and 1.5 GPa.

As shown in the right portion of FIG. 4, after the photocurable material 114 has been partially cured, the polymer film 410 is extracted or "demolded" by "peeling" the mold structure 104a away from the polymer film 410 (e.g., by moving the mold structures 104a and 104b away from teach other). The polymer film 410 remains on the mold structure 104b.

The partially cured polymer film 410 can be singulated by cutting the polymer film 410 into different polymer products 402a-d. The partially cured polymer film 410 can be singulated while it is still positioned on the mold structure 104b. This can be beneficial, for example, as the flat surface of the mold structure 104b can reduce bowing or warping of the polymer film 410 during the singulation process. Further, as the cuts are performed on a partially cured polymer film 410 that is less rigid and brittle (e.g., compared to a fully cured polymer film), the cuts result in fewer cracks or chips. Accordingly, the quality of the polymer products 402a-d are improved (e.g., compared to polymer products formed from singulating a fully cured polymer film). Further, the polymer film can be cut more precisely, accurately, and consistently, resulting in product products exhibit lower variability from product to product.

After the singulation process, the polymer products 402a-d are annealed to complete the curing process. As an example, the polymer products 402a-d can be heated and/or exposed to additional light until they are fully cured (e.g., until they exhibit a particular degree of rigidity and/or stiffness greater than that of a partially cured polyer film). In some cases, the polymer products 402a-d can be annealed until they have a Young's modulus greater than 2.0 GPa. The polymer products 402a-d can be annealed while they are still positioned on the mold structure 104b. After annealing, the polymer products 402a-d can be extracted from the mold structure 104b (e.g., by "peeling" the polymer products 402a-d away from the mold structure 104b).

In practice, the operational parameters of the process can vary, depending on the implementation. As an example, a photocurable material LPB-1102 (Mitsubishi) can be partially cured by exposing it to UV light having an intensity between approximately 15 to 75 mW/cm². The exposure times can be in the range of 10 to 300 seconds, depending on the intensity of the light. This results in a partially cured polymer film having a tensile modulus in the range of approximately 0.5 to 1.5 GPa. This is soft enough that it may be readily singulated without chipping or cracking using die cutting, water-jet, and/or milling machine techniques. After singulation, each of the polymer products can be annealed by exposing it to a heating cycle between 40° C. to 150° C. for between 15 to 120 minutes.

As another example, a thiol-ene-based photocurable material MLP-02 (Magic Leap) can be partially cured by exposing it to UV light having an intensity between approximately 15 to 150 mW/cm². The exposure times can be in the range of 60 to 420 seconds, depending on the intensity of the light. This results in a partially cured polymer film having a tensile modulus in the range of approximately 0.5 to 1.5 GPa. This is soft enough that it may be readily singulated without chipping or cracking using die cutting, water-jet, and/or milling machine techniques. After singulation, each of the polymer products can be annealed by exposing it to a heating cycle between 125° C. to 250° C. for between 20 to 120 minutes. In some cases, the polymer products may shrink in size after the heating cycle (e.g., shrink between 5 and 10 in thickness, depending on initial degree of cross-linking in the photocurable material before it has been annealed).

In some cases, a photocurable material can be deposited into a singulation frame. The singulation frame can constructed from one or more materials that are rigid but not brittle, such that it can be cut without introducing cracks or chips along its edges. The photocurable material can be cured directly within the singulation frame, and singulated into separate polymer products by cutting along the singulation frame, rather than along the photocurable material itself. Accordingly, the quality of the resulting polymer products is improved (e.g., as the polymer material is not directly cut at all).

Figure 5:
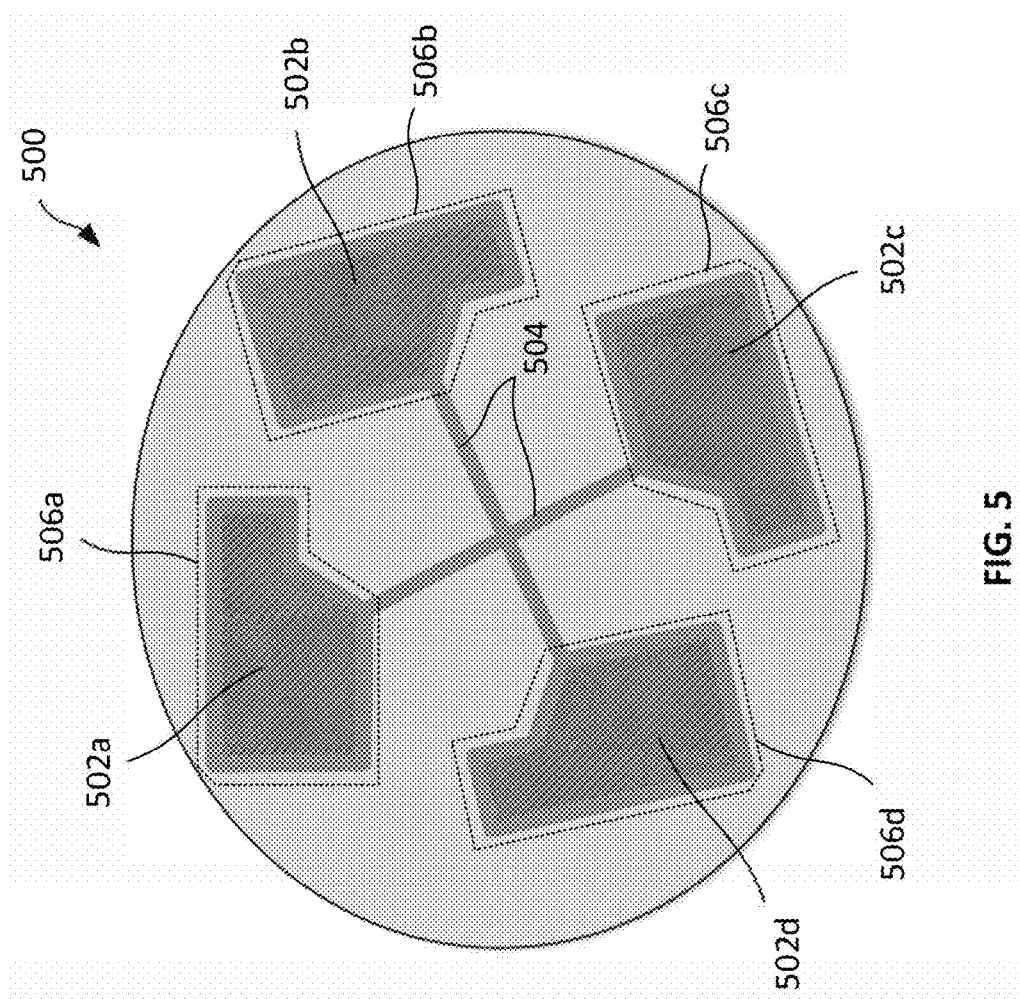
FIG. 5 is a schematic diagram of an example singulation frame used to produce polymer products.

A plan view of an example singulation frame 500 is shown in FIG. 5. The singulation frame 500 defines several apertures 502a-d, each corresponding to a different polymer product. Further, the singulation frame 500 defines a network of channels 504 interconnecting the apertures 502a-d.

The singulation frame 500 is constructed from one or more materials that are rigid but not brittle, such that it can be cut without introducing cracks or chips along its edges. In some cases, the singulation frame 500 can be constructed from one or more polymers, such as polycarbonate-based, acrylate-based, and/or polystyrene-based materials that are transparent or partially transparent to wavelengths of light suitable to cure the photocurable material (e.g., UV wavelengths). In some cases, the singulation frame 500 can include a polymer, such as Teflon, along the edges defining the apertures 502a-d.

The thickness of the singulation frame 500 can vary, depending on the implementation. In some cases, the singulation frame 500 can have a thickness that is at least 50 μm less than the height of the spacer structures 126 (e.g., 50 μm less than the height of the spacer structures, 100 μm less than the height of the spacer, structures, 150 μm less than the height of the spacer structures, etc.), such that the singulation frame 500 does not interfere with the interaction between the spacer structures 126 and the mold structures 104a and 104b.

During the production process, the singulation frame 500 is positioned on top of the mold structures 104b (e.g., such that the apertures 502a-d align with the corresponding portions of the mold structure 104b defining the features of the polymer products). A photocurable material is dispensed into the apertures 502a-d. The mold structures 104a and 104b are moved into proximity with one another (e.g., by moving the actuable stages 102a and/or 102b described with respect to FIG. 1), such that the photocurable material is enclosed by the mold structures 104a and 104b within the singulation frame 500. The photocurable material is cured by application of heat and/or light.

After curing, a singulation process is performed by cutting the singulation frame 500 along the periphery of the apertures 502a-d (e.g., along paths 506a-d at least partially encircling the apertures 502a-d). Accordingly, each polymer product includes cured polymer material encircled or "framed" by a portion of the singulation frame 500.

Although example mold structures 104a and singulation frames are shown and described above, these are merely illustrative examples. In practice, the configuration of each can differ, depending on the implementation. As an example, a mold structure can include areas for casting and curing any number of different polymer products (e.g., one, two, three, four, five, or more), each having any size or shape. As another example, a singulation frame can include any number of apertures to accommodate the casting and curing of any number of polymer products (e.g., one, two, three, four, five, or more), each having any size or shape.

In some cases, a system 100 also include one or more heating elements to apply heat to a photocurable material during the curing process. This can be beneficial, for example, in facilitating the curing process. For instance, in some cases, both heat and light can be used to cure the photocurable material. For example, the application of heat can be used to accelerate the curing process, make the curing process more efficient, and/or make the curing processes more consistent. In some cases, the curing process can be performed using heat instead of light. For example, the application of heat can be used to cure the photocurable material, and a light source need not be used.

Figure 6:
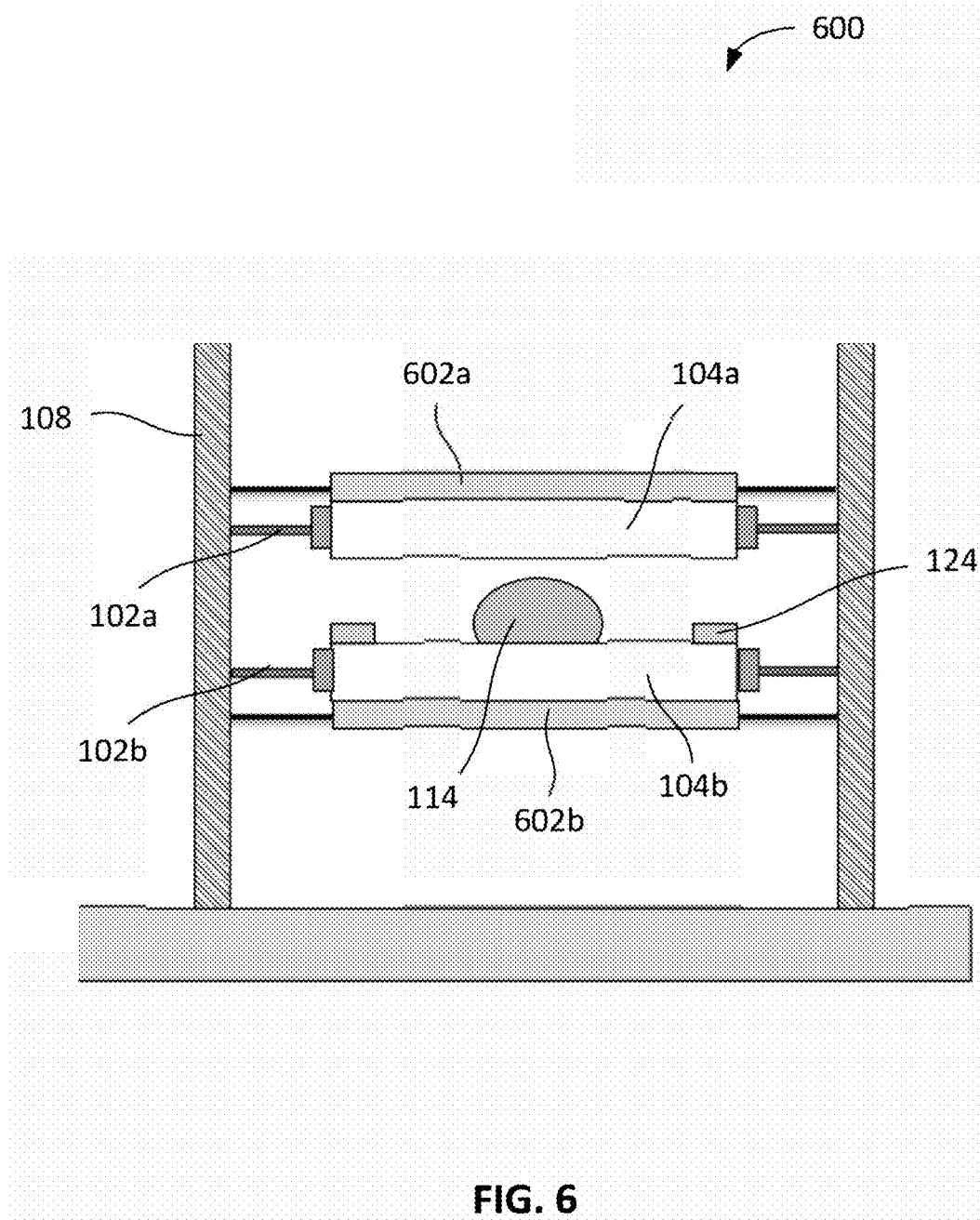
FIG. 6 is a diagram of an example system for producing polymer.

An example system 600 for producing polymer film is shown in FIG. 6. In general, the system 600 can be similar to the system 100 shown in FIG. 1. For example, the system 600 can include two actuable stages 102a and 102b, two mold structures 104a and 104b, a support frame 108, and a control module 110. For ease of illustration, the control module 110 is not shown in FIG. 6.

However, in this example, the system 600 does not include the two light sources 106a and 106b. Instead, it includes two heating elements 602a and 602b, positioned adjacent to the mold structures 104a and 104b, respectively. The heating elements 602a and 602b are configured to move with the mold structures 104a and 104b (e.g., through the actuable stages 102a and 102b), and are configured to apply heat to the photocurable material 114 between the mold structures 104a and 104b during the curing process.

The operation of the heating elements 602a and 602b can be controlled by the control module 110. For example, the control module 110 can be communicatively coupled to the heating elements 602a and 602b, and can selectively apply heat to the photocurable material 114 (e.g., by transmitting commands to the heating elements 602a and 602b).

Example heating elements 602a and 602b metal heating elements (e.g., nichrome or resistance wire), ceramic heating elements (e.g., molybdenum disilicide or PTC ceramic elements), polymer PTC heating elements, composite heating elements, or a combination thereof. In some cases, the heating elements 602a and 602b can include a metal plate to facilitate a uniform transfer heat to the mold structures 104a and 104b.

Although two heating elements 602a and 602b are shown in FIG. 6, in some cases, a system can include any number of heating elements (e.g., one, two, three, four, or more), or none at all. Further, although the system 600 is shown without light sources 106a and 106b, in some cases, a system can include one or more light sources and one or more heating elements in conjunction.

Figure 8A:
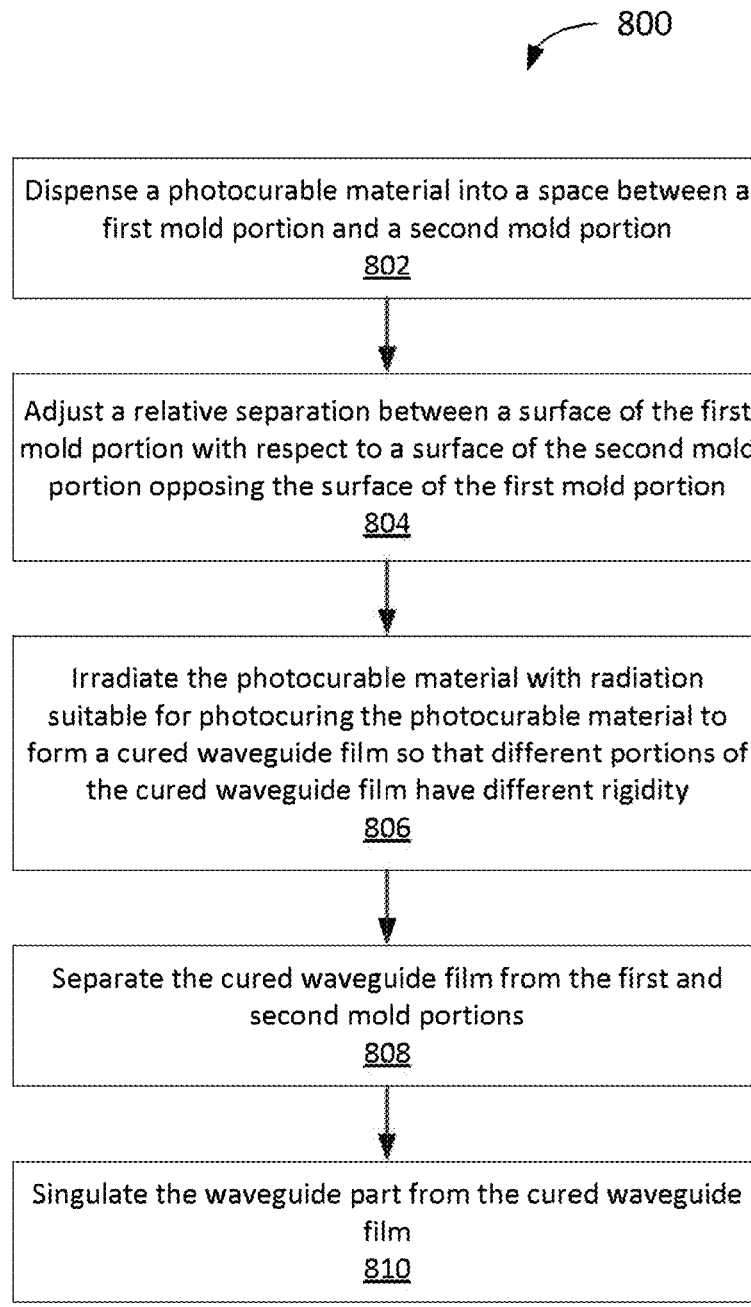
FIGS. 8A-8C are flow chart diagrams of example processes for producing a polymer product.

FIG. 8A shows an example process 800 for producing a polymer product. The process 800 can be performed, for example, using the systems 100 or 600. In some cases, the process 800 can be used to produce polymer films suitable for use in optical applications (e.g., as a part of waveguides or eyepieces in an optical imaging system). In some cases, the process can be particularly useful for producing waveguides or eyepieces suitable for use in a headset. For instance, the process can be used to produce waveguides or eyepieces having a thickness and/or cross-sectional area that are sufficient to guide light and project light covering a field of view of a headset wearer. As an example, the process can be used to produce polymer products having a thickness of no more than 1000 μm (e.g., as measured along the z-axis of a Cartesian coordinate system), such as 800 μm or less, 600 μm or less, 400 μm or less, 200 μm or less, 100 μm or less, or 50 μm or less, and an area of at least 1 $cm^2$ (e.g., as measured with respect an x-y plane of the Cartesian coordinate system), such as 5 $cm^2$ or more, 10 $cm^2$ or more, 50 $cm^2$ or more, such as up to about 100 $cm^2$ or less or up to 1000 $cm^2$ or less, and having a predetermined shape. In certain cases, the polymer film can have a dimension of at least 1 cm (e.g., 2 cm or more, 5 cm or more, 8 cm or more, 10 cm or more, such as about 30 cm or less) in at least one direction in the x-y plane.

In the process 800, a photocurable material is dispensed into a space between a first mold portion and a second mold portion opposite the first mold portion (step 802). Example mold portions are shown and described, for example, with respect to FIGS. 1-3.

A relative separation between a surface of the first mold portion is adjusted with respect to a surface of the second mold portion opposing the surface of the first mold portion to fill the space between the first and second mold portions (step 804). Example techniques for adjusting a relative separation between two mold portions are shown and described, for example, with respect to FIGS. 1 and 2.

The photocurable material in the space is irradiated with radiation suitable for photocuring the photocurable material to form a cured waveguide film so that different portions of the cured waveguide film have different rigidity (step 806). In some cases, different portions of the photocurable material are irradiated with different amounts of radiation. The portions of the photocurable material irradiated with higher radiation doses can correspond to portions of the cured waveguide film having higher rigidity than portions of the waveguide film irradiated with lower radiation doses. In some cases, different amounts of radiation are supplied by irradiating the space through a mask. The mask can include apertures corresponding to the predetermined shape of the waveguide part. Example techniques and masks for selectively controlling a rigidity of a waveguide film during photocuring are shown and described, for example, with respect to FIG. 3.

The cured waveguide film is separated from the first and second mold portions (step 808). The waveguide part is then singulated from the cured waveguide film (step 810). The waveguide part corresponds to portions of the cured waveguide film having a higher rigidity than other portions of the cured waveguide film. In some cases, the waveguide part can be singulated using techniques such as die-cutting, milling, water-jet cutting, ultrasonic cutting, or laser cutting.

Figure 8B:
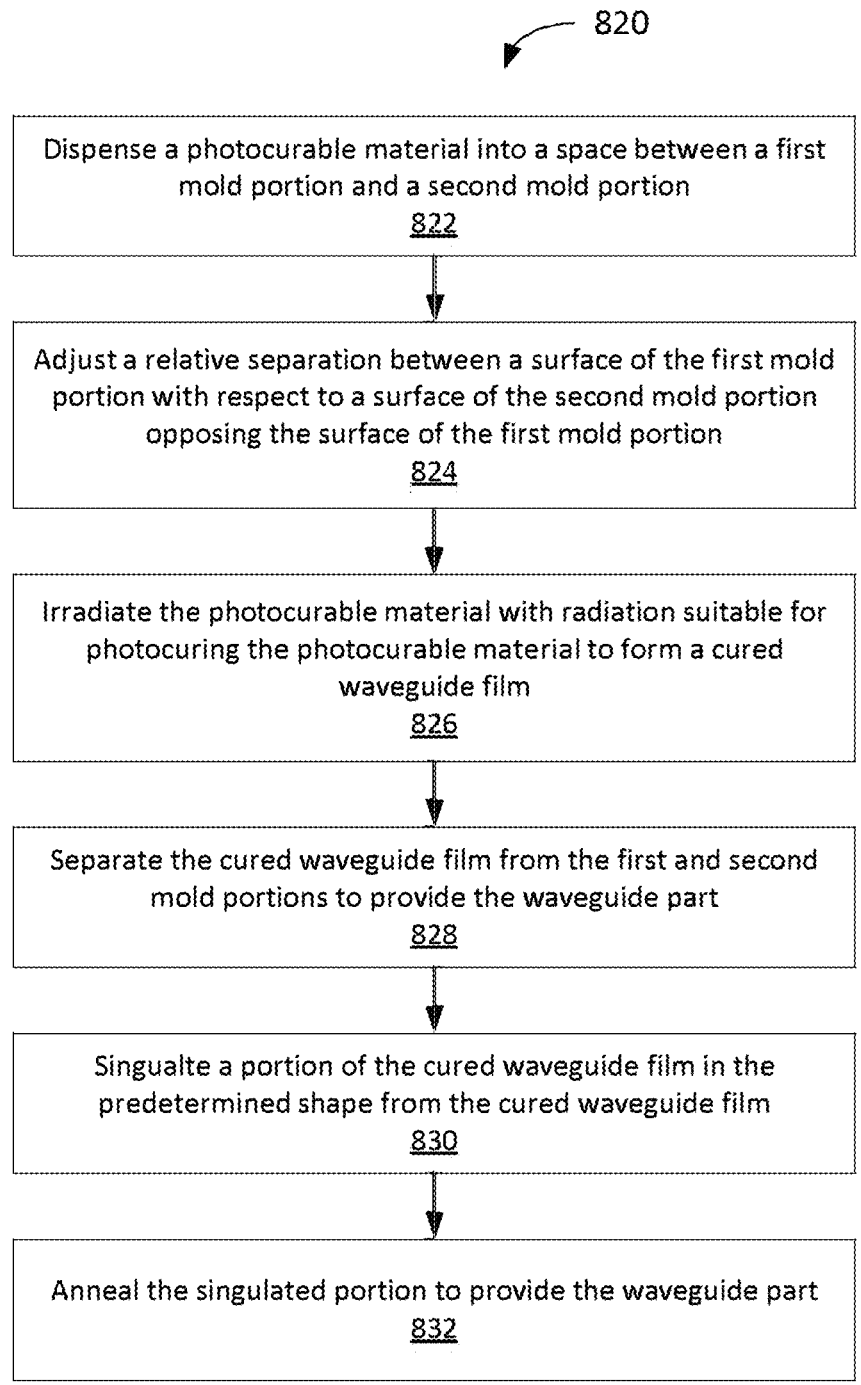

FIG. 8B shows another example process 820 for producing a polymer product. The process 820 can be performed, for example, using the systems 100 or 600. Similar to the process 800, the process 800 can be used to produce polymer films suitable for use in optical applications (e.g., as a part of waveguides or eyepieces in an optical imaging system), and can be particularly useful for producing waveguides or eyepieces suitable for use in a headset. For instance, the process can be used to produce waveguides or eyepieces having a thickness and/or cross-sectional area that are sufficient to guide light and project light covering a field of view of a headset wearer. As an example, the process can be used to produce polymer products having a thickness of no more than 1000 μm (e.g., as measured along the z-axis of a Cartesian coordinate system), and an area of at least 1 $cm^2$ (e.g., as measured with respect an x-y plane of the Cartesian coordinate system), and having a predetermined shape. In certain cases, the polymer film can have a dimension of at least 1 cm in at least one direction in the x-y plane.

In the process 820, a photocurable material is dispensed into a space between a first mold portion and a second mold portion opposite the first mold portion (step 822). Example mold portions are shown and described, for example, with respect to FIGS. 1-3.

A relative separation between a surface of the first mold portion is adjusted with respect to a surface of the second mold portion opposing the surface of the first mold portion to fill the space between the first and second mold portions (step 824). Example techniques for adjusting a relative separation between two mold portions are shown and described, for example, with respect to FIGS. 1 and 2.

The photocurable material in the space is irradiated with radiation suitable for photocuring the photocurable material to form a cured waveguide film (step 826). Example techniques and systems for irradiating a photocurable material are shown and described, for example, with respect to FIG. 1.

The cured waveguide film is separated from the first and second mold portions to provide the waveguide part (step 828). A portion of the cured waveguide film is then singulated in the predetermined shape from the cured waveguide film (830). In some cases, a portion of the waveguide part can be singulated using techniques such as die-cutting, milling, water-jet cutting, ultrasonic cutting, or laser cutting.

The singulated portion is annealed to provide the waveguide part (step 832). The waveguide part has a rigidity higher than a rigidity of the cured waveguide film. In some implementations, the singulated portion is annealed by irradiating the singulated portion with radiation suitable for photocuring the photocurable material. In some implementations, singulated portion is annealed by heating the singulated portion. Example techniques for annealing a singulated portion of a waveguide film are shown and described, for example, with respect to FIG. 4.

Figure 8C:
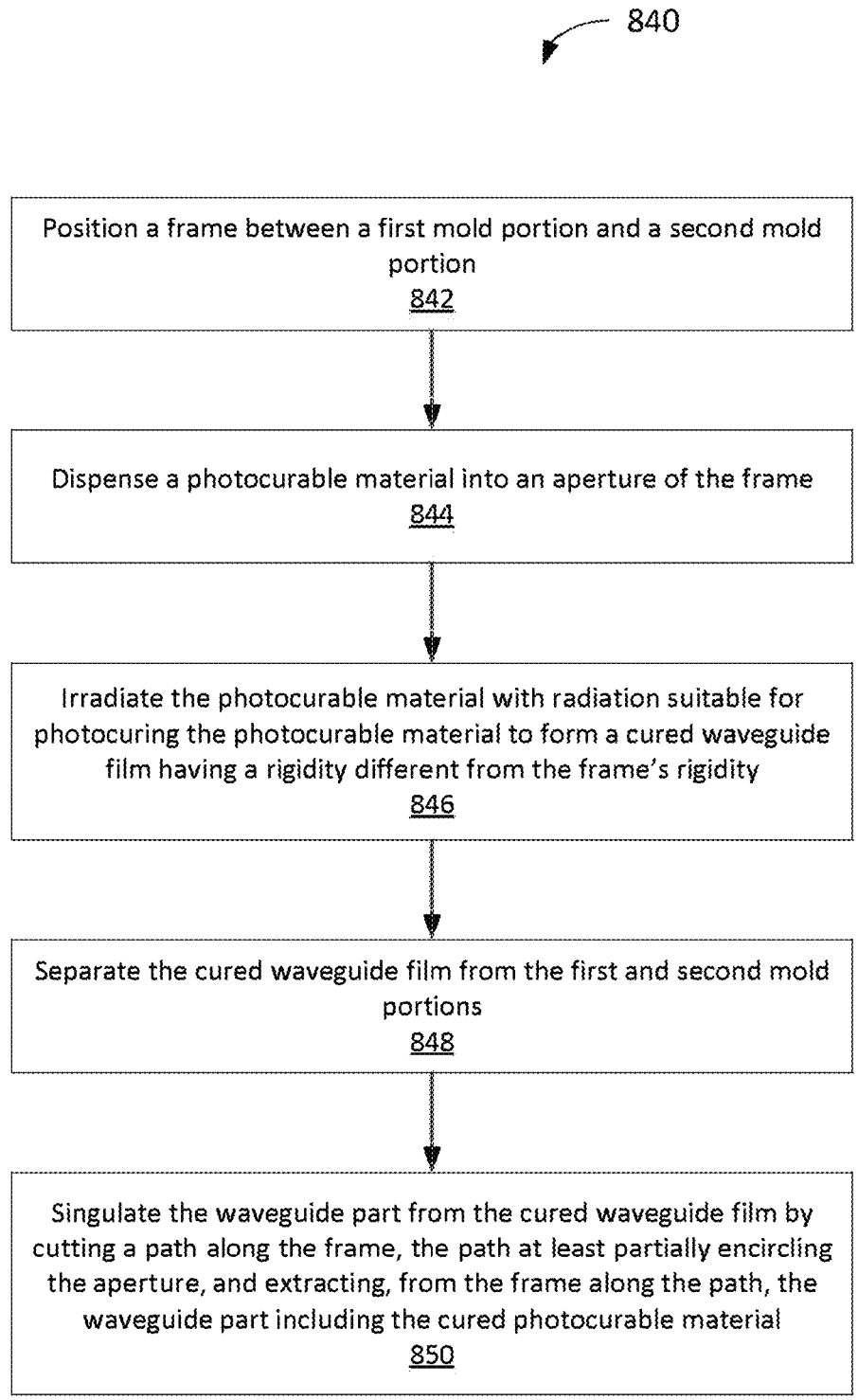

FIG. 8C shows another example process 840 for producing a polymer product. The process 840 can be performed, for example, using the systems 100 or 600. Similar to the processes 800 and 820, the process 840 can be used to produce polymer films suitable for use in optical applications (e.g., as a part of waveguides or eyepieces in an optical imaging system), and can be particularly useful for producing waveguides or eyepieces suitable for use in a headset. For instance, the process can be used to produce waveguides or eyepieces having a thickness and/or cross-sectional area that are sufficient to guide light and project light covering a field of view of a headset wearer. As an example, the process can be used to produce polymer products having a thickness of no more than 100 µm (e.g., as measured along the z-axis of a Cartesian coordinate system), and an area of at least 1 $cm^2$ (e.g., as measured with respect an x-y plane of the Cartesian coordinate system), and having a predetermined shape. In certain cases, the polymer film can have a dimension of at least 1 cm in at least one direction in the x-y plane.

In the process 840, a frame is positioned between a first mold portion and a second mold portion (step 842). The frame has a particular rigidity. Further, the frame defines a first aperture having the predetermined shape. In some cases, the frame defines a plurality of apertures, each having the predetermined shape. Example mold portions are shown and described, for example, with respect to FIGS. 1-3. An example frame is shown and described, for example, with respect to FIG. 5.

A photocurable material is dispensed into the aperture of the frame (step 844). In some cases, the photocurable material is dispensed into each of the apertures of the frame.

The photocurable material in the aperture is irradiated with radiation suitable for photocuring the photocurable material to form a cured waveguide film having a rigidity different from the frame's rigidity (step 846). In some cases, the photocurable material in each of the apertures is simultaneously irradiated with the radiation. Example techniques and systems for irradiating a photocurable material are shown and described, for example, with respect to FIG. 1.

The cured waveguide film is separated from the first and second mold portions (step 848). The waveguide part is then singulated from the cured waveguide film by cutting a path along the frame and extracting, from the frame along the path, the waveguide part including the cured photocurable material (step 850). The path at least partially encircles the aperture. In some cases, the cured waveguide film includes the cured photocurable material in each of the apertures. In some cases, a portion of the waveguide part can be singulated using techniques such as die-cutting, milling technique, water-jet cutting, ultrasonic cutting, or laser cutting.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the control module 110 can be implemented using digital electronic circuitry, or in computer software, firmware, or hardware, or in combinations of one or more of them. In another example, the process 800 shown in FIG. 8 can be implemented, at least in part, using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 9:
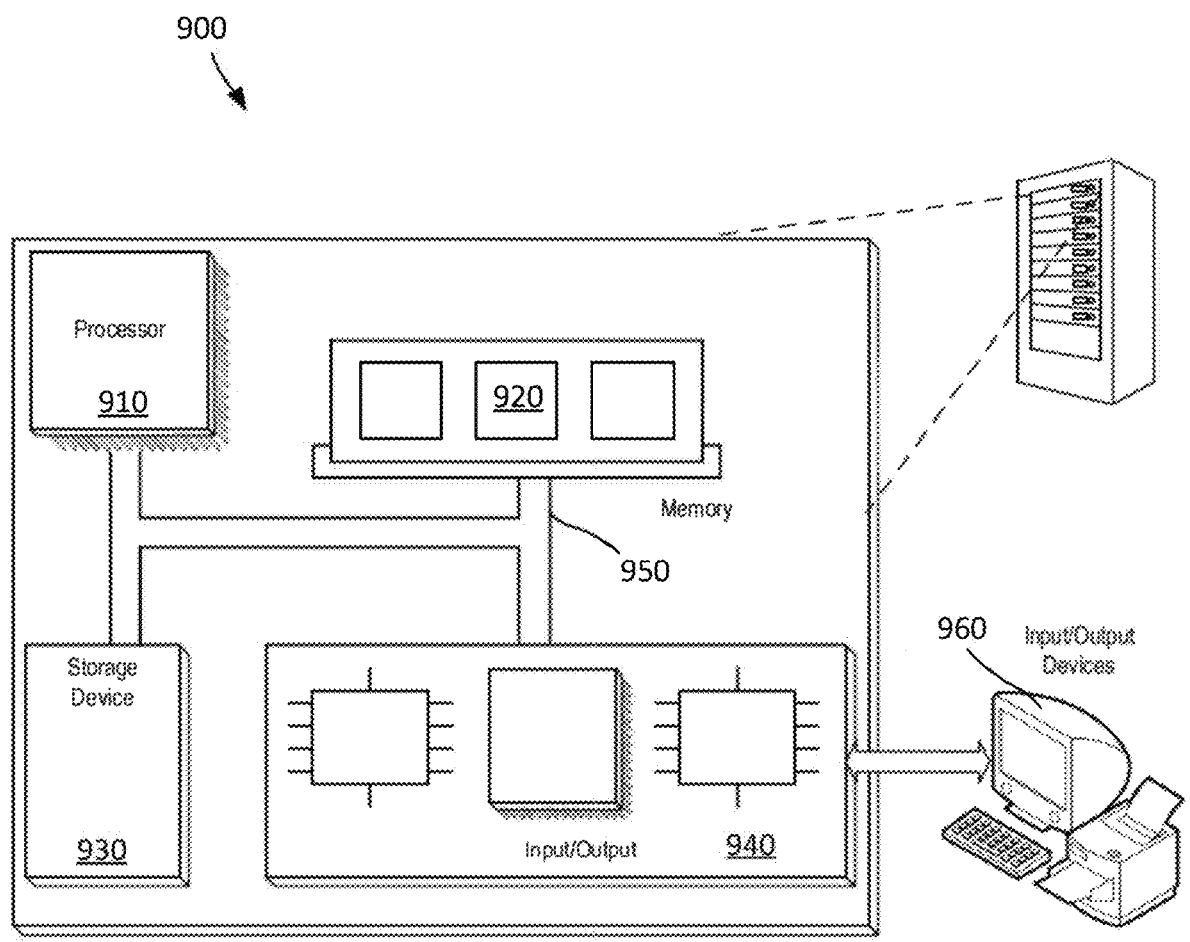
FIG. 9 is a diagram of an example computer system.

FIG. 9 shows an example computer system 900 that includes a processor 910, a memory 920, a storage device 930 and an input/output device 940. Each of the components 910, 920, 930 and 940 can be interconnected, for example, by a system bus 950. The processor 910 is capable of processing instructions for execution within the system 900. In some implementations, the processor 910 is a single-threaded processor, a multi-threaded processor, or another type of processor. The processor 910 is capable of processing instructions stored in the memory 920 or on the storage device 930. The memory 920 and the storage device 930 can store information within the system 900.

The input/output device 940 provides input/output operations for the system 1600. In some implementations, the input/output device 940 can include one or more of a network interface device, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:

1. A method for forming a waveguide part, the method comprising:
    dispensing a photocurable material between a first mold portion and a second mold portion opposite the first mold portion;
    irradiating the photocurable material with radiation suitable for photocuring the photocurable material to form a cured waveguide film so that different portions of the cured waveguide film have different rigidity;
    separating the cured waveguide film from the first and second mold portions; and
    singulating the waveguide part from the cured waveguide film,
    wherein the waveguide part corresponds to portions of the cured waveguide film having a higher rigidity than other portions of the cured waveguide film.

2. The method of claim 1, wherein different portions of the photocurable material are irradiated with different amounts of radiation.

3. The method of claim 2, wherein portions of the photocurable material irradiated with larger amounts of radiation correspond to portions of the cured waveguide film having higher rigidity than portions of the cured waveguide film corresponding to portions of the photocurable material irradiated with smaller amounts of radiation.

4. The method of claim 2, wherein different amounts of radiation are supplied by irradiating the photocurable material through a mask.

5. The method of claim 4, wherein the mask includes apertures corresponding to a predetermined shape of the waveguide part.

6. The method of claim 1, wherein the waveguide part has a thickness of no more than 1000 µm and an area of at least 1 $cm^2$.

7. The method of claim 1, wherein at least some of the other portions of the cured waveguide film enclose the portions of the cured waveguide film corresponding to the waveguide part.

8. The method of claim 1, further comprising:
    singulating a plurality of waveguide parts from the cured waveguide film,
    wherein the plurality of waveguide parts corresponds to portions of the cured waveguide film having a higher rigidity than other portions of the cured waveguide film.

9. A method for forming a waveguide part, the method comprising:

dispensing a photocurable material between a first mold portion and a second mold portion opposite the first mold portion;

irradiating the photocurable material with radiation suitable for photocuring the photocurable material to form a cured waveguide film;

singulating a portion of the cured waveguide film from the cured waveguide film; and annealing the singulated portion to provide the waveguide part, wherein the waveguide part has a rigidity higher than a rigidity of the cured waveguide film.

10. The method of claim 9, wherein the singulated portion is annealed by irradiating the singulated portion with radiation suitable for photocuring the photocurable material.

11. The method of claim 9, wherein the singulated portion is annealed by heating the singulated portion.

12. The method of claim 9, wherein the waveguide part has a thickness of no more than 1000 μm and an area of at least 1 cm$^2$.

13. The method of claim 9, further comprising:

singulating a plurality of portions of the cured waveguide film from the cured waveguide film; and annealing the plurality of singulated portions to provide a plurality of waveguide parts.

14. A method for forming a waveguide part, the method comprising:

positioning a frame between a first mold portion and a second mold portion, the frame having a first rigidity, and the frame defining an aperture;

dispensing a photocurable material into the aperture of the frame;

irradiating the photocurable material in the aperture with radiation suitable for photocuring the photocurable material to form a cured waveguide film having a second rigidity different from the first rigidity; and singulating the waveguide part from the cured waveguide film by cutting a path along the frame, the path at least partially encircling the aperture, and extracting, from the frame along the path.

15. The method of claim 14, wherein the frame defines a plurality of apertures.

16. The method of claim 15, wherein the photocurable material is dispensed into each of the apertures of the frame.

17. The method of claim 16, wherein the photocurable material in each of the apertures is simultaneously irradiated with the radiation.

18. The method of claim 17, wherein the cured waveguide film comprises the cured photocurable material in each of the apertures.

19. The method of claim 14, wherein the waveguide part has a thickness of no more than 1000 μm and an area of at least 1 cm$^2$.

20. The method of claim 14, wherein the first rigidity is greater than the second rigidity.

\* \* \* \* \*

UNITED STATES PATENT AND TRADEMARK OFFICE
CERTIFICATE OF CORRECTION

| | | |
|---|---|---|
| PATENT NO. | : 12,296,549 B2 | Page 1 of 1 |
| APPLICATION NO. | : 17/539969 | |
| DATED | : May 13, 2025 | |
| INVENTOR(S) | : Sharad D. Bhagat, Chieh Chang and Christophe Peroz | |

It is certified that error appears in the above-identified patent and that said Letters Patent is hereby corrected as shown below:

In the Claims

Claim 14, Column 24, Line 11, delete "extracting," and insert -- extracting the waveguide part --.

Signed and Sealed this
Twenty-sixth Day of August, 2025

Coke Morgan Stewart
*Acting Director of the United States Patent and Trademark Office*